United States Patent
Shibuya

(10) Patent No.: US 8,868,040 B2
(45) Date of Patent: Oct. 21, 2014

(54) WIRELESS COMMUNICATION TERMINAL, WIRELESS COMMUNICATION SYSTEM, WIRELESS COMMUNICATION METHOD, AND COMPUTER PROGRAM PRODUCT

(71) Applicant: Olympus Corporation, Tokyo (JP)

(72) Inventor: Kazuyuki Shibuya, Sagamiharai (JP)

(73) Assignee: Olympus Corporation, Tokyo (JP)

( * ) Notice: Subject to any disclaimer, the term of this patent is extended or adjusted under 35 U.S.C. 154(b) by 101 days.

(21) Appl. No.: 13/784,357

(22) Filed: Mar. 4, 2013

(65) Prior Publication Data

US 2013/0237188 A1 Sep. 12, 2013

(30) Foreign Application Priority Data

Mar. 6, 2012 (JP) .................................. 2012-048968

(51) Int. Cl.
*H04M 1/66* (2006.01)
*H04W 12/06* (2009.01)
*H04W 76/02* (2009.01)
*H04W 8/00* (2009.01)

(52) U.S. Cl.
CPC .............. *H04W 12/06* (2013.01); *H04W 76/02* (2013.01); *H04W 8/005* (2013.01)
USPC ......... 455/411; 455/410; 455/414.1; 455/420

(58) Field of Classification Search
CPC ..... H04W 8/005; H04W 12/02; H04W 12/06; H04W 28/18; H04W 28/10; H04W 76/02; H04W 76/04; H04W 88/06
USPC ........................ 455/410, 411, 414.1, 419, 420
See application file for complete search history.

(56) References Cited

U.S. PATENT DOCUMENTS

2007/0142042 A1* 6/2007 Thoresson .................... 455/418
2007/0155425 A1* 7/2007 Balakrishnan et al. ..... 455/556.2
2008/0081637 A1* 4/2008 Ishii et al. ..................... 455/453

FOREIGN PATENT DOCUMENTS

JP 2010-278536 A 12/2010

OTHER PUBLICATIONS

"Wi-Fi Simple Configuration Technical Specification 2.0.0", 2010, https://www.wi-fi.org/knowledge_center_overview.php?type=4, (4 pages).

* cited by examiner

*Primary Examiner* — Jean Gelin
(74) *Attorney, Agent, or Firm* — Westerman, Hattori, Daniels & Adrian, LLP

(57) ABSTRACT

A first wireless communication terminal includes: a receiver configured to receive an instruction to initiate a setting process of setting unique information to be used for a first encrypted communication with a second wireless communication terminal; a setting unit configured to set based on the instruction, a first setting method to be used for the setting process; and a processor configured to, if a first report is received from the second wireless communication terminal after the instruction is received, the first report including information indicating a second setting method to be used for the second wireless communication terminal to perform the first encrypted communication, and the first and second setting methods being identical, perform the setting process using the first setting method, and perform a set-up process of specifying an authentication method and an encryption method to be used for a second encrypted communication performed after the first encrypted communication.

33 Claims, 12 Drawing Sheets

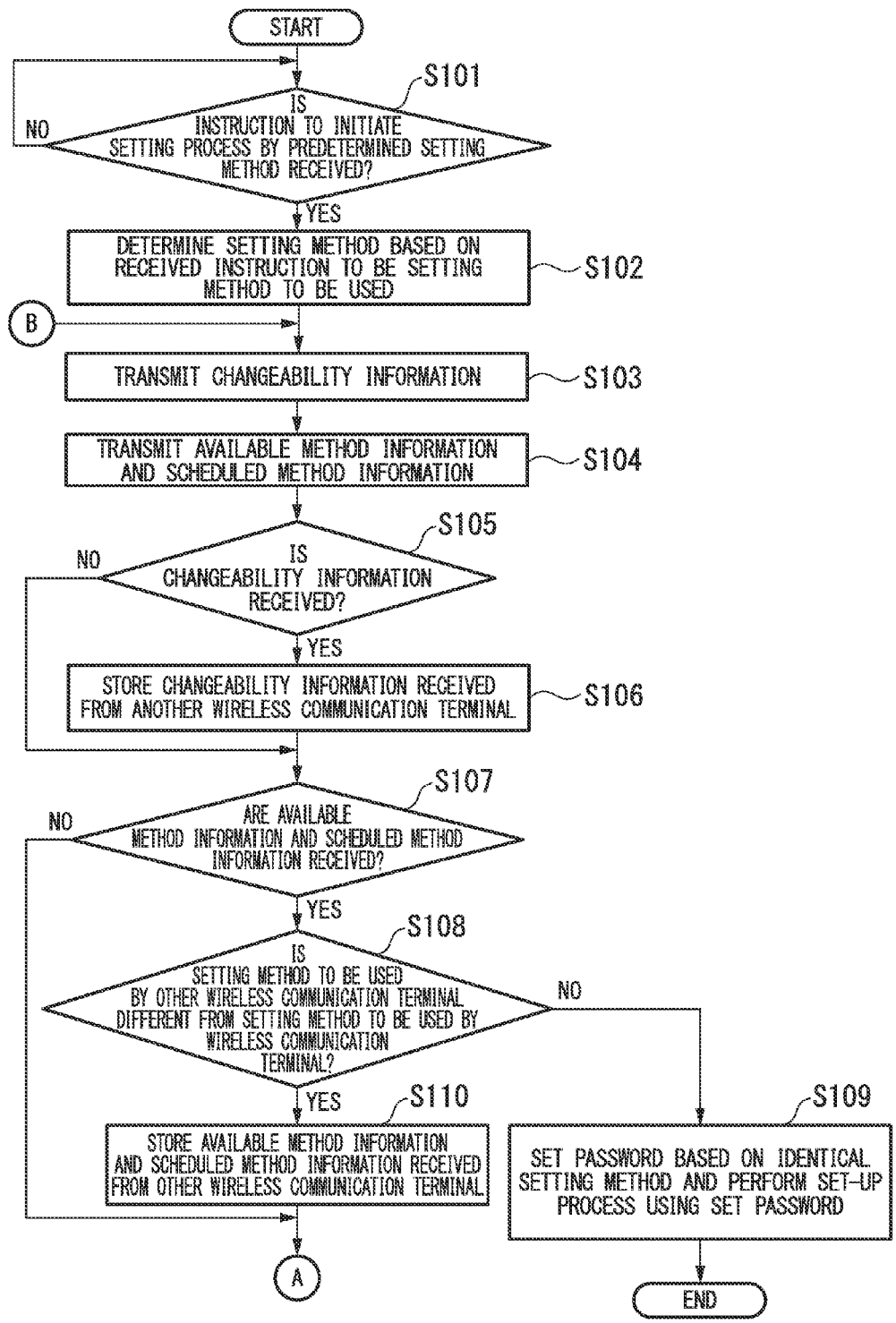

WIRELESS COMMUNICATION TERMINAL, WIRELESS COMMUNICATION SYSTEM, WIRELESS COMMUNICATION METHOD, AND COMPUTER PROGRAM PRODUCT

BACKGROUND OF THE INVENTION

1. Field of the Invention

The present invention relates to a wireless communication terminal, a wireless communication system, a wireless communication method, and a computer program product.

Priority is claimed on Japanese Patent Application No. 2012-048968, filed Mar. 6, 2012, the content of which is incorporated herein by reference.

2. Description of the Related Art

Conventionally, for a wireless communication terminal to participate in a network (infrastructure network) via an access point (hereinafter, "AP"), it has been necessary to set to the wireless communication terminal, various information (network setting information), such as a network ID (SSID), an authentication method, an encryption method, and an encryption key. For this setting, various inputs are necessary on the wireless communication terminal.

On the other hand, a set-up process of setting; network setting information to a wireless communication terminal without complicated manual inputs by a user has been performed. In the set-up process, the wireless communication terminal performs encrypted communication with another wireless communication terminal, and thus specifies a predetermined authentication method and a predetermined encryption method. After the set-up process, the wireless communication terminal participating in the wireless network authenticates the other wireless communication terminal by the predetermined authentication method, and performs encrypted communication with the authenticated other wireless communication terminal using the predetermined encryption method.

For a wireless communication terminal to participate in an infrastructure network by the above set-up process, Wi-Fi Protected Setup (Trade Mark) (hereinafter, "WPS") is defined as a wireless LAN standard. Wi-Fi Simple Configuration Technical Specification 2.0.0 (https://www.wi-fi.org/knowledge_center_overview.php?type=4) discloses technology for WPS.

Several set-up methods are defined for WPS. For example, both a user of a wireless communication terminal with the wireless LAN function as a non-participant which wants to participate in the network, and a user of a wireless communication terminal as a participant in the network (primarily, AP) push an actual button, or click a button on screens using a GUI (graphical user interface) function, thereby performing a set-up process using unique value defined by the WPS. This unique value is used by both the wireless communication terminals as unique information for properly identifying a wireless communication terminal targeted for the set-up process. Hereinafter, this setting method is referred to as a "PBC method". Different from this setting method, the wireless communication terminal as the non-participant generates a PIN code as an arbitrary value and displays the PIN code on a screen thereof. Then, that PIN code is input as the unique information to the wireless communication terminal as the participant (primarily, AP), thereby performing a set-up process. Hereinafter, this setting method is referred to as a "PIN method".

By these set-up processes, it is possible to safely transmit the network setting information stored by the AP to the wireless communication terminal. After the network setting information is transmitted by the WPS, the wireless communication terminal can set thereto the received network setting information without the user doing time-consuming work, such as inputting an encryption key. Then, the wireless communication terminal performs an authentication process with the AP as needed, and thus can perform communication of encrypted data with the AP. When the PIN code is input to the AP, for example, a user may input the PIN code using a browser of another terminal in the network to which the AP belongs.

Different from the infrastructure mode necessitating the AP, an ad-hoc mode for wireless communication terminals to perform WLAN communication directly with one another has been recently becoming popular primarily among mobile terminals, such as game devices or cameras. In the ad-hoc mode, a central terminal, such as the AP in the infrastructure mode, is not present in the network. Instead, each terminal has an equal right to communicate with another terminal.

Similar to the infrastructure mode, setting of network setting information in the ad-hoc mode is complicated. It is preferable that the conventional WPS is compatible with, the ad-hoc network. In this case, a terminal that manages the network, such as the AP in the infrastructure mode, is not present in the ad-hoc mode. For this reason, in a case of the PBC method, a set-up process with a wireless communication terminal as a non-participant can be performed by a user of any wireless communication terminal as a participant pushing a button.

For the WPS, if a setting method differs between wireless communication terminals that perform wireless communication with each other, it is impossible to find an adequate wireless communication terminal targeted for the set-up process. To find a wireless communication terminal targeted for the set-up process under this situation, it is necessary for a user of at least one of the wireless communication terminals to change the setting method and perform the set-up process again.

Japanese Patent Application Laid-Open Publication No. 2010-278536 discloses technology in which when an adequate target for the set-up process cannot be found, the set-up process is performed again while decreasing a load of a user.

in the above technology, in the PBC method, when no wireless communication terminal targeted for a set-up process is found, or when multiple wireless communication, terminals targeted for the set-up process are found, the wireless communication terminal, performs the set-up process again by the PBC method without a user instruction. Then, the wireless communication terminal repeats the set-up process by the PBC method until one adequate wireless communication terminal targeted for the set-up process is found.

SUMMARY

A first wireless communication terminal according to one aspect of the present invention includes, but is not limited to: a communication unit; a receiving unit; a setting unit; a processor; a changing unit; and a controller. The communication unit is configured to wirelessly communicate with a second wireless communication terminal. The receiving unit is configured to receive art instruction to initiate a setting process of setting unique information to be used for a first encrypted communication with the second wireless communication terminal. The setting unit is configured to set based on the instruction, a first setting method of a plurality of setting methods to be used for the setting process. The processor is configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication. The changing unit is configured to change the first setting method in a case that the first report is not received from the second wireless communication terminal after the instruction is received. The controller is configured to control the communication unit to transmit to the second wireless communication terminal, a second report indicating that the first setting method has been changed.

A first wireless communication terminal according to another aspect of the present invention includes, but is not limited to: a communication unit; a receiving unit; a setting unit; and a processor. The communication unit is configured to wirelessly communicate with a second wireless communication terminal. The receiving unit is configured to receive an instruction to initiate a setting process of setting unique information to be used for a first encrypted communication with the second wireless communication terminal. The setting unit is configured to set based on the instruction, a first setting method of a plurality of setting methods to be used for the setting process. The processor is configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication. The processor is configured to perform the setting process using the first setting method and perform the set-up process in a case that the first report, is not received from the second wireless communication terminal after the instruction is received, and a second report is received, the second report indicating that a third setting method to be used for the second wireless communication terminal to perform the first encrypted communication has been changed.

A communication system according to another aspect of the present invention includes, but is not limited to; a first wireless communication terminal; and a second wireless communication terminal. The first wireless communication terminal includes, but is not limited to: a communication unit; a receiving unit; a setting unit; a processor; a changing unit; and a controller. The communication unit is configured to wirelessly communicate with a second wireless communication terminal. The receiving unit is configured to receive an instruction to initiate a setting process of setting unique information to be used for a first encrypted communication with the second wireless communication terminal. The setting unit is configured to set based on the instruction, a first setting method of a plurality of setting methods to be used for the setting process. The processor is configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed alter the first encrypted communication. The changing unit is configured to change the first setting method in a case that the first report is not received from the second wireless communication terminal after the instruction is received. The controller is configured to control the communication unit to transmit to the second wireless communication terminal, a second report indicating that the first setting method has been changed.

A communication system according to another aspect of the present invention includes, but is not limited to: a first wireless communication terminal; and a second wireless communication terminal. The first wireless communication terminal includes, but is not limited to: a communication unit; a receiving unit; a setting unit; and a processor. The communication unit is configured to wirelessly communicate with a second wireless communication terminal. The receiving unit is configured to receive an instruction to initiate a setting process of setting unique information to be used for a first encrypted communication with the second wireless communication terminal. The setting unit is configured to set based on the instruction, a first setting method of a plurality of setting methods to be used for the setting process. The processor is configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication. The processor is configured to perform the setting process using the first setting method and perform the set-up process in a case that the first report is not received from the second wireless communication terminal after the instruction is received, and a second report is received, the second report indicating that a third setting method to be used for the second wireless communication terminal to perform the first encrypted communication has been changed.

A wireless communication method for a first wireless communication terminal according to another aspect of the present invention includes, but is not limited to the following processes. An instruction is received to initiate a setting process of setting unique information to be used for a first encrypted communication with a second wireless communication terminal. A first setting method of a plurality of setting methods to be used for the setting process is set based on the instruction. In a case that a first report is received from the second wireless communication terminal after the instruction is received, the first report including information indicating a second setting method to be used for the second wireless communication terminal to perform the first encrypted communication, and the second setting method being identical to the first setting method, the setting process is performed using the first setting method, and a set-up process of specifying an authentication method and an encryption method to be used for a second encrypted communication with the second wireless communication terminal is performed, the second encrypted communication being performed after the first encrypted communication. In a case that the first report is not received from the second wireless communication terminal after the instruction is received, the first setting method is changed, and a second report indicating that the first setting method has been changed is transmitted to the second wireless communication terminal.

A wireless communication method for a first wireless communication terminal according to another aspect of the present invention includes, but is not limited to the following processes. An instruction is received to initiate a setting process of setting unique information to be used for a first encrypted communication with a second wireless communication terminal. A first setting method of a plurality of setting methods to be used for the setting process is set based on the instruction. In a case that a first report is received from the second wireless communication terminal after the instruction is received, the first report including information indicating a second setting method to be used for the second wireless communication terminal to perform the first encrypted communication, and the second setting method being identical to the first setting method, the setting process is performed using the first setting method, and a set-up process of specifying an authentication method and an encryption method to be used for a second encrypted communication with the second wireless communication terminal is performed, the second encrypted communication being performed after the first encrypted communication. In a case that the first report is not received from the second wireless communication terminal after the instruction is received, and a second report is received, the second report indicating that a third setting method to be used for the second wireless communication terminal to perform the first encrypted communication has been changed, the setting process is performed using the first setting method and the set-up process is performed.

A computer program product according to another aspect of the present invention stores a program that causes a computer of a first wireless communication terminal to execute the following processes. An instruction is received to initiate a setting process of setting unique information to be used for a first encrypted communication with a second wireless communication terminal. A first setting method of a plurality of setting methods to be used for the setting process is set based on the instruction. In a case that a first report is received from the second wireless communication terminal after the instruction is received, the first report including information indicating a second setting method to be used for the second wireless communication terminal to perform the first encrypted communication, and the second setting method being identical to the first setting method, the setting process is performed using the first setting method, and a set-up process of specifying an authentication method and an encryption method to be used for a second encrypted communication with the second wireless communication terminal is performed, the second encrypted communication being performed after the first encrypted communication. In a case that the first report is not received from the second wireless communication terminal after the instruction is received, the first setting method is changed, and a second report indicating that the first setting method has been changed is transmitted to the second wireless communication terminal.

A computer program product according to another aspect of the present invention stores a program that causes a computer of a first wireless communication terminal to execute the following processes. An instruction is received to initiate a setting process of setting unique information to be used for a first encrypted communication with a second wireless communication terminal. A first setting method of a plurality of setting methods to be used for the setting process is set based on the instruction. In a case that a first report is received from the second wireless communication terminal after the instruction is received, the first report including information indicating a second setting method to be used for the second wireless communication terminal to perform the first encrypted communication, and the second setting method being identical to the first setting method, the setting process is performed using the first setting method, and a set-up process of specifying an authentication method and an encryption method to be used for a second encrypted communication with the second wireless communication terminal is performed, the second encrypted communication being performed after the first encrypted communication. In a case that the first report is not received from the second wireless communication terminal after the instruction is received, and a second report is received, the second report indicating that a third setting method to be used for the second wireless communication terminal to perform the first encrypted communication has been changed, the setting process is performed using the first setting method and the set-up process is performed.

BRIEF DESCRIPTION OF THE DRAWINGS

The above features and advantages of the present invention will be more apparent from the following description of certain preferred embodiments taken in conjunction with the accompanying drawings, in which:

FIG. 3 is a flowchart illustrating a procedure of operation for the wireless communication terminal according to the embodiment of the present invention;

DETAILED DESCRIPTION OF THE PREFERRED EMBODIMENTS

The present invention will now be described herein with reference to illustrative embodiments. The accompanying drawings explain a wireless communication terminal and a wireless communication method in the embodiments. The size, the thickness, and the like of each illustrated portion might be different from those of each portion of an actual device.

Those skilled in the art will recognize that many alternative embodiments can be accomplished using the teachings of the present invention and that the present invention is not limited to the embodiments illustrated herein for explanatory purposes.

Figure 1:
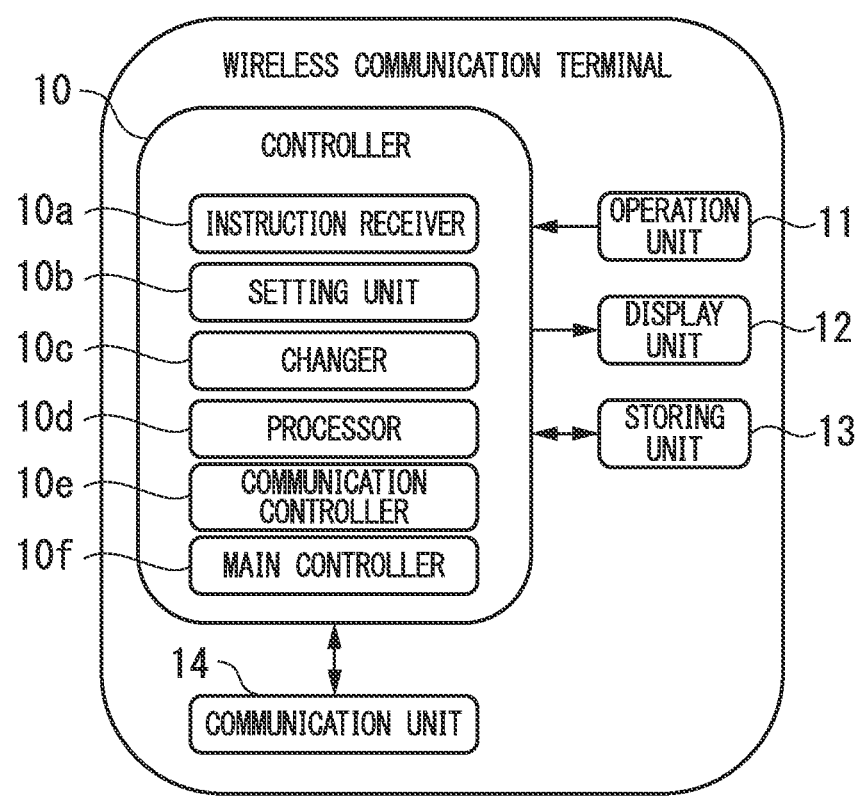
FIG. 1 is a block diagram illustrating a configuration of a wireless communication terminal according to an embodiment of the present invention.

Hereinafter, embodiments of the present invention are explained with reference to the accompanying drawings. FIG. 1 illustrates a configuration of a wireless communication terminal (wireless communication terminals 1 and 2 as will be explained later) according to an embodiment of the present invention. Multiple wireless communication terminals, each of which has the same configuration as shown in FIG. 1, constitute a wireless communication system according to the present embodiment. The wireless communication terminal shown in FIG. 1 includes: a controller 10; an operation unit 11; a display unit 12; a storing unit 13, and a communication unit 14.

The controller 10 controls each unit of the wireless communication terminal. The operation unit 11 includes operation members, such as buttons for a user operation, and outputs a signal as a result of the user operation. The display unit 12 displays various information for a user. The storing unit 13 stores various information to be used for a process performed by the wireless communication terminal. The storing unit 13 may include a non-volatile memory or a volatile memory. The storing unit 13 may include both a non-volatile memory and a volatile memory. The communication unit 14 wirelessly communicates with another wireless communication terminal under control of the controller 10. Thus, the communication, unit 14 transmits and receives information and data to and from the other wireless communication terminal. When information or data is received from the other wireless communication terminal, the communication unit 14 outputs the received information or data to the controller 10. The information or data output to the controller 10 is stored in the storing unit 13.

The controller 10 includes: an instruction receiver 10a; a setting unit 10b; a changer 10c; a processor 10d; a communication controller 10e; and a main controller 10f. The instruction receiver 10a detects an instruction to initiate a setting process as will be explained later, in order for the wireless communication terminal as a non-participant to participate in a wireless network. The instruction receiver 10a may receive an instruction based on any one of the PBC method and the PIN method.

In the case of the PBC method, the instruction receiver 10a monitors a user operation of the operation unit 11. Upon detecting that the user has pressed a button as an operation member, clicked a button on a screen of the display unit 12 using the GUI function, or selected an option of a menu by clicking a button, the instruction receiver 10a receives an instruction to initiate a setting process. In the case of the PIN method, the instruction receiver 10a receives an instruction to initiate a setting process upon detecting that an application for a setting process or a set-up process has been activated (the application has activated by a user operation or automatically after power-on).

Based on the instruction received by the instruction receiver 10a, the setting unit 10b sets a setting method to be used by the wireless communication terminal. After the instruction receiver 10a receives the instruction, the changer 10c determines whether or not the setting method to be used by the wireless communication terminal is identical to the setting method to be used by another wireless communication terminal. If the setting method differs between those wireless communication terminals, and if the wireless communication terminal determines to change the setting method, the wireless communication terminal changes the setting method to be used. The changer 10c of the present embodiment updates the setting method to be used, to the setting method determined by the main controller 10f. As a result of this process, there are a case where the setting method to be used is changed before and after that process and a case where the setting method is not changed before and after that process. If the setting method to be used differs before and after the process, it means that the setting method to be used has been changed.

After the instruction receiver 10a receives the instruction, the processor 10d performs a setting process of setting unique information (password) to be used for encrypted communication with another wireless communication terminal during the set-up process. After the setting process, the processor 10d performs encrypted communication with the other wireless communication terminal using the password set in the setting process, and thus performs a set-up process of specifying a predetermined authentication method and a predetermined encryption method. After the set-up process, the wireless communication terminal authenticates the other wireless communication terminal by the authentication method specified in the set-up process. Thus, the wireless communication terminal performs encrypted, communication with the authenticated other wireless communication terminal.

The communication controller 10e controls transmission and reception of Probe Request, Probe Response, and the like, which will be explained later. The main controller 10f manages the states of the instruction receiver 10a, the setting unit 10b, the changer 10c, the processor 10d, and the communication controller 10e. Thus, the main controller 10f allocates processes to the respective units.

Figure 2A:
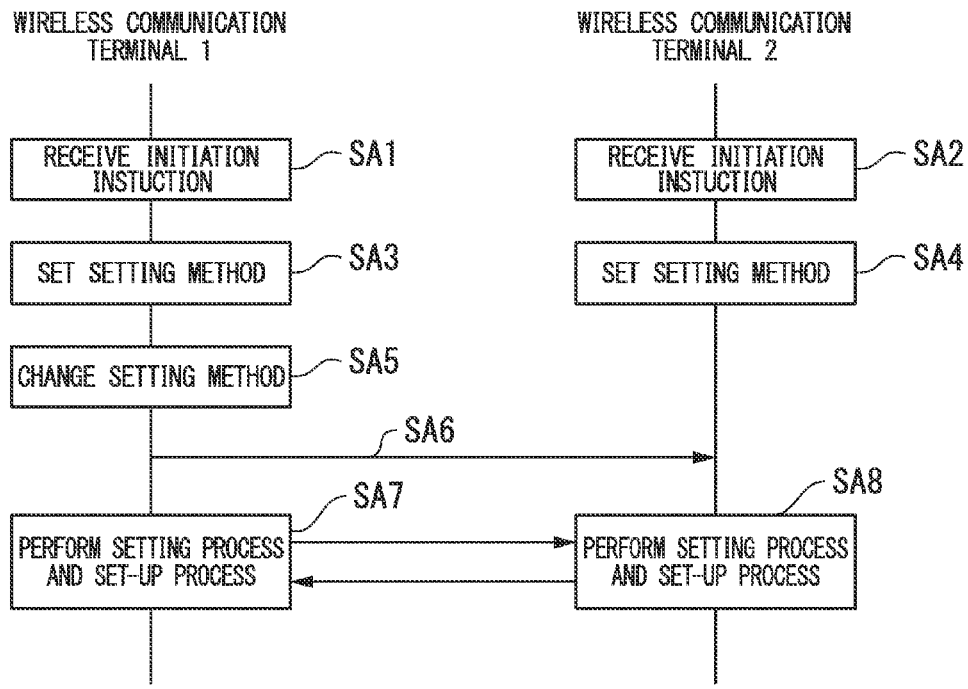
FIGS. 2A and 2B are sequence charts illustrating procedures of operations for the wireless communication terminal according to the embodiment of the present invention.
Figure 2B:
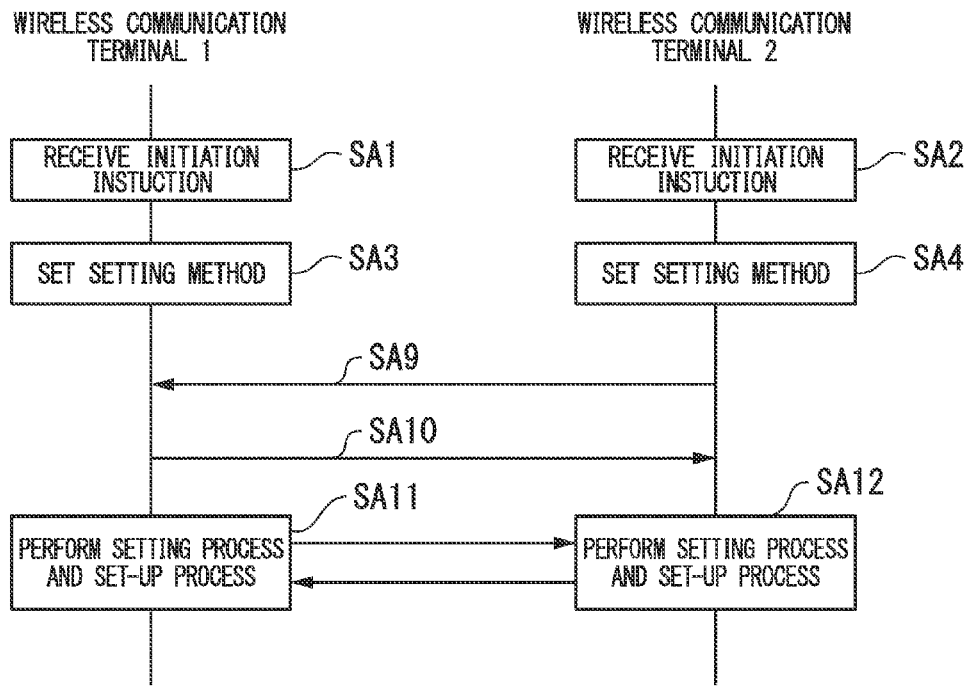

Hereinafter, operation of the wireless communication terminal is explained. FIGS. 2A and 2B schematically illustrate operation of the wireless communication terminal of the present embodiment.

FIG. 2A illustrates operation in a case where the setting method to be used is changed. Firstly, in each of the wireless communication terminals 1 and 2 that are to communicate with each other, the instruction receiver 10a receives an instruction to initiate a setting method (steps SA1 and SA2). Then, the setting unit 10b in each of the wireless communication terminals 1 and 2 sets thereto a setting method to be used, based on the instruction received by the instruction receiver 10a (steps SA3 and SA4).

Thereafter, in a case where the wireless communication terminal 1 has not received from the wireless communication terminal 2, a method report including information indicating a setting method to be used by the wireless communication terminal 2 which is identical to the setting method to be used by the wireless communication terminal 1, the changer 10c changes the setting method to be used, which has been set by the setting unit 10b (step SA5). The case where the method report including the information indicating the same setting method as the setting method to be used by the wireless communication terminal includes two cases. One case is a case where a method report including information indicating a setting method different from the setting method to be used by the wireless communication terminal. The other case is a case where no method report is received. In the wireless communication terminal 1 having changed the setting method, the communication controller 10e causes the communication unit 14 to transmit to the wireless communication terminal 2, a change report indicating that the setting method to be used has been changed (step SA6).

After the change report has been transmitted, the processor 10d of the wireless communication terminal 1 having changed the setting method performs a setting process using the changed setting method, and then performs a set-up process (step SA7). In a case where the wireless communication terminal 2 has not received a method report including information indicating the setting method to be used by the wireless communication terminal 1 which is identical to the setting method to be used by the wireless communication terminal 2, and the wireless communication terminal 2 has received a change report from the wireless communication terminal 1, the processor 10d of the wireless communication terminal 2 performs a setting process using the set setting method, and then performs a set-up process (step SA8), in the set-up process, the wireless communication terminals 1 and 2 wirelessly communicate with each other.

FIG. 28 illustrates a case where the setting method to be used is not changed. Processes from steps SA1 to SA4 are similar to those from steps SA1 to SA4 shown in FIG. 2A, and therefore explanations are omitted here. After the setting method is set, the communication controller 10e of each of the wireless communication terminals 1 and 2 causes the communication unit 14 to transmit to the other wireless communication terminal, a method report including information indicating the setting method to be used by the wireless communication terminal (steps SA9 and SA10).

in each of the wireless communication terminals 1 and 2 having received the method report, if the setting method indicated by the information included in the method report is identical to the setting method to be used by the wireless communication terminal, the processor 10d performs a setting process using the set setting method, and then performs a set-up process (steps SA11 and SA12). In the set-up process, the wireless communication terminals 1 and 2 wirelessly communicate with each other.

As shown in FIG. 2A, in a case where the setting method to be used differs between the two wireless communication terminals that are to communicate with each other, one of the two wireless communication terminals changes the setting method. Thus, the probability that the setting method to be used will match between the two wireless communication terminals increases, thereby enhancing the success probability of the set-up process. Additionally, a user does not have to perform complicated inputs for the setting. Further, the probability that a user will have to repeatedly input an instruction to initiate a setting process due to a failure of the set-up process decreases, thereby decreasing the load of the user.

FIRST OPERATIONAL EXAMPLE

Hereinafter, the detailed operation of the wireless communication terminal is explained. The first operational example is explained here with reference to FIGS. 3 to 7. FIGS. 3 to 6 illustrate the detailed operational procedure for the wireless communication terminal. FIG. 7 illustrates a specific example of operation based on the operation shown in FIGS. 3 to 6. The operation shown in FIGS. 3 to 6 will be well understood after referring to FIG. 7.

As shown in FIG. 3, first, the main controller 10f confirms a state of the instruction receiver 10a, and determines whether or not an instruction to initiate a setting process by a predetermined setting method is received (step S101). The predetermined setting method may be either the PBC method or the PIN method, or another setting method. The storing unit 13 previously stores available method information indicating setting methods available to the wireless communication terminal. The instruction received by the instruction receiver 10a corresponds to any one of the setting methods indicated by the available setting information. The available method information indicates all setting methods supported by the wireless communication terminal. It is assumed in the present embodiment that the setting method to be used by the wireless communication terminal is one of the setting methods indicated by the available method information of the wireless communication terminal.

If an instruction to initiate a setting process by a predetermined, setting method is not received in step S101, determination in step S101 is performed again. If an instruction to initiate a setting process by a predetermined setting method is received in step S101 (step S101: YES), the main controller 10f determines the setting method based on the instruction received by the instruction receiver 10a, to be the setting method to be used by the wireless communication terminal (step S102). The determined setting method is reported to the setting unit 10b. Then, the setting unit 10b generates scheduled method information indicating the setting method determined in step S102. The generated scheduled method information is stored in the storing unit 13. The scheduled method information indicates a single setting method (similarly assumed hereinafter).

Then, the main controller 10f gives to the communication controller 10e, an instruction to transmit changeability information. The communication controller 10e receiving the instruction causes the communication unit 14 to transmit the changeability information (step S103). The changeability information means information indicating whether or not a change request as will be explained later can be received from another wireless communication terminal. Further, if the change request can be received, the changeability information indicates whether or not the setting method to be used by the wireless communication terminal can be changed. The storing unit 13 previously stores the changeability information, which is used for the above process.

Then, the main controller 10f gives to the communication controller 10e, an instruction to transmit the available method information and the scheduled method information of the wireless communication terminal. The communication controller 10e receiving the instruction causes the communication unit 14 to transmit the available method information and the scheduled method information of the wireless communication terminal (step S104). As explained above, the available method information and the scheduled method information of the wireless communication terminal are stored in the storing unit 103 and used for the above process.

The changeability information, the available method information, and the scheduled method information are transmitted by being included in Beacon, Probe Request, Probe Response (a method report, a scheduled method report, a change report, a changeable report, a not-changeable report), or the like. For example, the wireless communication terminal present in the network initiates periodical transmission of Beacon in steps S103 and S104. Further, the wireless communication terminal initiates transmission of Probe Response in response to the Probe Request received from the other wireless communication terminal. In steps S103 and S104, a wireless communication terminal not present in the network initiates periodical transmission of Probe Request until, the set-up process is initiated. The available method information corresponds to Configuration Methods or Selected Registrar Configuration Methods in the case of the WPS. The scheduled method information corresponds to Device Password ID in the case of the WPS.

Then, the main controller 10f determines whether or not the changeability information is received from the other wireless communication terminal. For example, the main controller 10f receives from the other wireless communication terminal, any one of Beacon, Probe Request, and Probe Response. Then, the main controller 10f determines whether or not the changeability information is included in the received frame (step S105).

If any one of Beacon, Probe Request, and Probe Response has been received, and if the changeability information is included in the received frame, it is determined that the changeability information has been received. If none of Beacon, Probe Request, and Probe Response has been received, it is determined that the changeability information has not been received. If any one of Beacon, Probe Request, and Probe Response has been received, and if the changeability information is not included in the received frame, it is determined that the changeability information has not been received.

If the changeability information has not been received in step S105 (step S105: NO), the operation proceeds to step S107. If the changeability information has been received in step S105 (step S105: YES), the main controller 10f stores in the storing unit 13, the changeability information included in the received frame (step S106). In step S106, if changeability information of the other wireless communication terminal has already been stored in the storing unit 13, mat changeability information is updated to the received changeability information.

Then, the main controller 10f determines whether or not the available method information and the scheduled method information are received from, the other wireless communication terminal (step S107). For example, the main controller 10f receives any one of Beacon, Probe Request, and Probe Response, and determines whether or not the available method information and the scheduled method information are included in the received frame.

If any one of Beacon, Probe Request, and Probe Response has been received, and if the available method information and the scheduled method information are included in die received frame, it is determined that the available method information and the scheduled method information have been received. If none of Beacon, Probe Request, and Probe Response has been received, it is determined that necessary information has not been received. If any one of Beacon, Probe Request, and Probe Response has been received, and if at least one of the available method information and the scheduled method information is not included in the received frame, it is determined that necessary information has not been received.

If necessary information has not been received in step S107 (step S107: NO), the operation proceeds to step S111 shown in FIG. 4. If the available method information and the scheduled method information are received in step S107 (step S107: YES), the controller 10f compares the setting method indicated by the received scheduled method information to the setting method indicated by the scheduled method information of the wireless communication terminal which is stored in the storing unit 13. Thus, the controller 10f determines whether or not the setting method to be used by the other wireless communication terminal differs from the setting method to be used by the wireless communication terminal (step S108).

If the setting method indicated by the received scheduled method information is not identical to the setting method indicated by the scheduled method information of the wireless communication terminal which is stored in the storing unit 13, it is determined that the setting method to be used by the other wireless communication terminal differs from the setting method to be used by the wireless communication terminal. If the setting method indicated by the received scheduled method information is identical to the setting method indicated by the scheduled method information of the wireless communication terminal which is stored in the storing unit 13, it is determined that the setting method to be used by the other wireless communication terminal is identical to the setting method to be used by the wireless communication terminal.

If it is determined in step S108 that the setting method to be used by the other wireless communication terminal is identical to the setting method to be used by the wireless communication terminal (step S108: NO), the main controller KM instructs the processor 10d to initiate the setting process and the set-up process. The processor 10d receiving the instruction sets a password by the setting process based on the setting method to be used by the wireless communication terminal (which is identical to the setting method to be used by the other wireless communication terminal). Then, the processor 10d performs the set-up process using the set password (step S109).

The details of the specific process in step S109 are as follows. In a case where a setting method to be used is the PBC method, the processor 10d generates a unique value (eight-digit number of 0), and sets the generated unique value as a password. In a case where the setting method to be used is the PIN method, the processor 10d of one of the two wireless communication terminals generates a value (an eight-digit number including a random seven-digit number and a one-digit checksum), and displays the value on the display unit 12. Then, a user refers to the valise, and then inputs the value to the other wireless communication terminal by operating the operation unit 11 of the other wireless communication terminal. The processor 10d of the wireless communication terminal having generated and displayed the value sets the generated value as a password. The processor 10d of the wireless communication terminal to which a user has input the value sets the input value as a password. The above is the details of the setting process.

Then, the processor 10d performs the set-up process using the set password, thus specifying a predetermined authentication method and a predetermined encryption method to be used for encrypted communication after the set-up process, in the set-up process, the processor 10d performs encrypted communication with the other wireless communication terminal via the communication controller 10e and the communication unit 14, according to need. In this case, regardless of whether the setting method to be used is the PBC method or the PIN method, the processor 10d performs a calculation process by combining the password set in the setting process and the encryption key to be used in the set-up process. Then, the processor 10d checks a result of the calculation against a result of calculation similarly performed by the other wireless communication, terminal. Thus, the processor 10d determines whether or not the other wireless communication terminal performing the set-up process is an adequate wireless communication terminal. The above are the details of the set-up process.

If the setting method to be used by the other wireless communication terminal differs from the setting method to be used by the wireless communication terminal in step S108 (step S108: YES), the main controller 10f stores in the storing unit 13, the received available method information and the scheduled method information (step S110), if the available method information and the scheduled method information of the other wireless communication terminal have already been stored in the storing unit 13, those available method information and scheduled method information are updated to the received available method information and scheduled method information.

Figure 4:
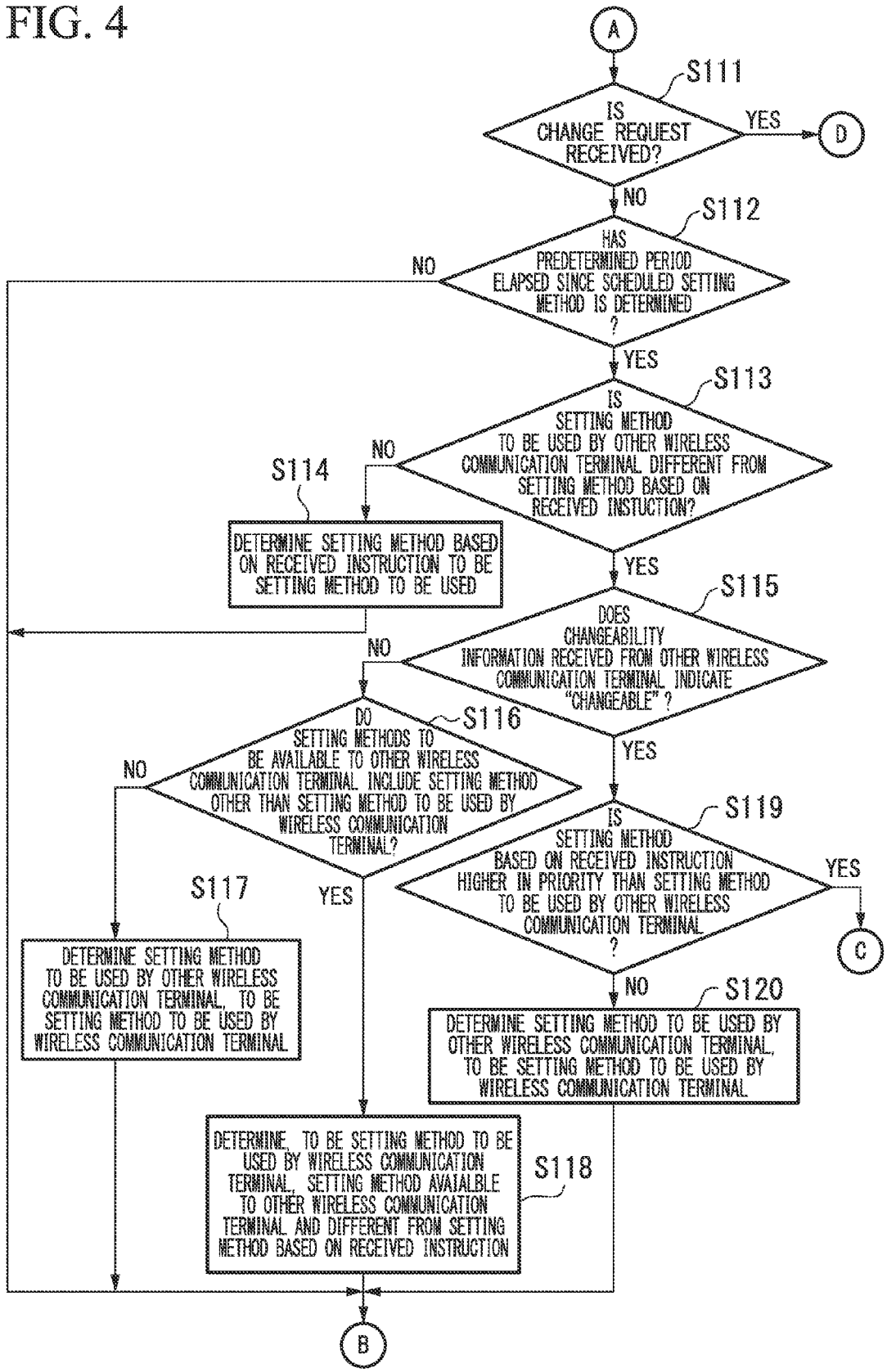
FIG. 4 is a flowchart illustrating a procedure of operation for the wireless communication terminal according to the embodiment of the present invention.

Then, as shown in FIG. 4, the main controller 10f determines whether or not a change request is received from the other wireless communication terminal (step S111). The change request indicates a request for changing the setting method to be used. The change request includes specification information that, specifies the changed setting method to be used. If the change request has been received in step S111 (step S111: YES), the operation proceeds to step S141 shown in FIG. 6. If the change request has not been received in step S111 (step S111: NO), the main controller 10f determines whether or not a predetermined period has elapsed since the setting method to be used has been determined previously (step S112).

If the predetermined period has not elapsed since the setting method to be used has been previously determined in step S112 (step S112: NO), the operation proceeds to step S103 shown in FIG. 3. If the predetermined period has elapsed since the setting method to be used has been previously determined in step S112 (step S112: YES), the main controller 10f compares the setting method indicated by the scheduled method information of the other wireless communication terminal stored in the storing unit 13 to the setting method based on the instruction received by the instruction receiver 10a of the wireless communication terminal. Thus, the main controller 10f determines whether or not the setting method to be used by the other wireless communication terminal differs from the setting method based on the instruction received by the wireless communication terminal (step S113).

If the setting method indicated by the scheduled method information of the other wireless communication terminal stored in the storing unit 13 is not identical, to the setting method based on the instruction received by the instruction receiver 10a of the wireless communication terminal, it is determined that the setting method to be used by the other wireless communication terminal differs from the setting method based on the instruction received by the wireless communication terminal, if the setting method indicated by the scheduled method information of the other wireless communication terminal stored in the storing unit 13 is identical to the setting method based on the instruction received by the instruction receiver 10a of the wireless communication terminal, it is determined that the setting method to be used by the other wireless communication terminal is identical to the setting method based on the instruction received by the wireless communication terminal, if the scheduled method information has not been received from the other wireless communication terminal, and if the scheduled method information of the other wireless communication terminal is not stored in the storing unit 13, it is determined that there is no scheduled method information of the other wireless communication terminal.

In step S113, if the setting method to be used by the other wireless communication terminal is identical to the setting method based on the instruction received by the wireless communication terminal, or if there is no scheduled method information of the wireless communication terminal (step S113: NO), the controller 10f determines the setting method based on the instruction received by the instruction receiver 10a, to be the setting method to be used by the wireless communication terminal (step S114). The determined setting method is reported to the changer 10c. Then, the changer 10c generates scheduled method information indicating the setting method determined in step S114. Then, the generated, scheduled, method information is stored in the storing unit 113. If it is determined in step S114 that the scheduled method information of the wireless communication terminal has already been stored in the storing unit 13, that scheduled method information is updated to the scheduled method information indicating the scheduled method determined in step S114. Then, the operation proceeds to step S103 shown in FIG. 3.

If the setting method to be used by the other wireless communication terminal differs from the setting method based on the instruction received by the wireless communication terminal in step S113 (step S113: YES), the controller 10f determines whether or not the changeability information of the other wireless communication terminal stored in the storing unit 13 indicates that the setting method to be used by the other wireless communication terminal is changeable (step S115).

If the changeability information of the other wireless communication terminal stored in the storing unit 13 indicates that the setting method to be used by the other wireless communication terminal is changeable (step S115: YES), the operation proceeds to step S119. If a result of the determination in step S115 falls into any one of the following three cases, the operation proceeds to step S116. The first case of the three cases is a case where the changeability information of the other wireless communication terminal stored in the storing unit 13 indicates that, the setting method to be used by the other wireless communication terminal is not changeable. The second case of the three cases is a case where the changeability information of the other wireless communication terminal stored in the storing unit 13 indicates that the change request cannot be received from the other wireless communication terminal. The third case of the three cases is a case where the changeability information has not been received from the other wireless communication terminal, and the changeability information of the other wireless communication terminal is not stored in the storing unit 13.

If a result of the determination in step S115 falls into one of the above three cases in step S115 (step S115: NO), the main controller 10f compares the setting methods indicated by the available method information of the other wireless communication terminal stored in the storing unit 13, to the setting method indicated by the scheduled method information of the other wireless communication terminal stored in the storing unit 13. Thus, the main controller 10f determines whether or not the setting methods available to the other wireless communication terminal include a setting method other than the setting method to be used by the other wireless communication terminal (step S116).

If at least, one of the setting methods indicated by the available method information of the other wireless communication terminal stored in the storing unit 13 is not identical to the setting method indicated by the scheduled method information of the other wireless communication terminal stored in the storing unit 13, it is determined that the setting methods available to the other wireless communication terminal include a setting method other than the setting method to be used by the other wireless communication terminal. If the available method information of the other wireless communication terminal stored in the storing unit 13 indicates only the setting method identical to the setting method indicated by the scheduled method information of the other wireless communication terminal stored in the storing unit 13, it is determined that the setting methods available to the other wireless communication terminal do not include a setting method other than the setting method to be used by the other wireless communication terminal.

If the setting methods available to the other wireless communication terminal do not include a setting method other than the setting method to be used by the other wireless communication terminal in step S116 (step S116: NO), the main controller 10f determines the setting method indicated by the scheduled method information of the other wireless communication terminal stored in the storing unit 13, to be the setting method to be used by the wireless communication terminal (step S117). The determined setting method is reported to the changer 10c. Then, the changer 10c generates scheduled method information indicating the setting method determined in step S117 and stores the generated scheduled method information in the storing unit 13. If the scheduled method information of the wireless communication terminal has already been stored in the storing unit 13 in step S117, that scheduled method information is updated to the scheduled method information indicating the scheduled method determined in step S117. Then, the operation proceeds to step S103 shown in FIG. 3.

If the setting methods available to the other wireless communication terminal include a setting method other than the setting method to be used by the other wireless communication terminal in step S116 (step S116: YES), the main controller 10f determines, to be the setting method to be used by the wireless communication terminal, the setting method indicated by the available method information of the other wireless communication terminal stored in the storing unit 13 and differing from the setting method based on the instruction received by the instruction receiver 10a (step S118). The determined setting method is reported to the changer 10c. Then, the changer 10c generates scheduled method information indicating the setting method determined in step S118 and stores the generated scheduled method information in the storing unit 13. If the scheduled method information of the wireless communication terminal has already been stored in the storing unit 13 in step S118, that scheduled method information is updated to the scheduled method information indicating the scheduled method determined in step S118. Then, the operation proceeds to step S103 shown in FIG. 3.

If the changeability information of the other wireless communication terminal stored in the storing unit 13 indicates that the setting method to be used by the other wireless communication terminal is "changeable" in step S115 (step S115: YES), the main controller 10f determines whether or not the setting method based on the instruction received by the instruction receiver 10a is higher in priority level than the setting method indicated by the scheduled method information of the other wireless communication terminal stored in the storing unit 13 (step S119).

According to several references, it is possible to set the priority level to each setting method. For example, when security is regarded as a reference, the higher priority level may be set to the setting method as the security level of the setting method increases. The PIN method is higher in security level than the PBC method. For this reason, the priority level of the PIN method may be set to be higher than that of the PBC method. When convenience for users is regarded as a reference, the convenience for users is higher in the PBC method than in the PIN method since a user has to input a value displayed on one of the wireless communication terminals to the other one of the wireless communication terminals. For this reason, the priority level of the PBC method may be set to be higher than that of the PIN method.

If the setting method based on the instruction received by the instruction receiver 10a is equal in priority level to, or lower in priority level than the setting method indicated by the scheduled method information of the other wireless communication terminal stored in the storing unit 13 (step S119: NO), the main controller 10f determines, to be the setting method to be used by the wireless communication terminal, the setting method indicated by the scheduled method information of the other wireless communication terminal stored in the storing unit 13 (step S120). The determined setting method is reported to the changer 10c. Then, the changer 10c generates scheduled method information indicating the setting method, determined in step S120 and stores the generated scheduled method information in the storing unit 13. If the scheduled method information of the wireless communication terminal has already been stored in the storing unit 13 in step S120, that scheduled method information is updated to the scheduled method information indicating the scheduled method determined in step S120. Then, the operation proceeds to step S103 shown in FIG. 3.

Figure 5:
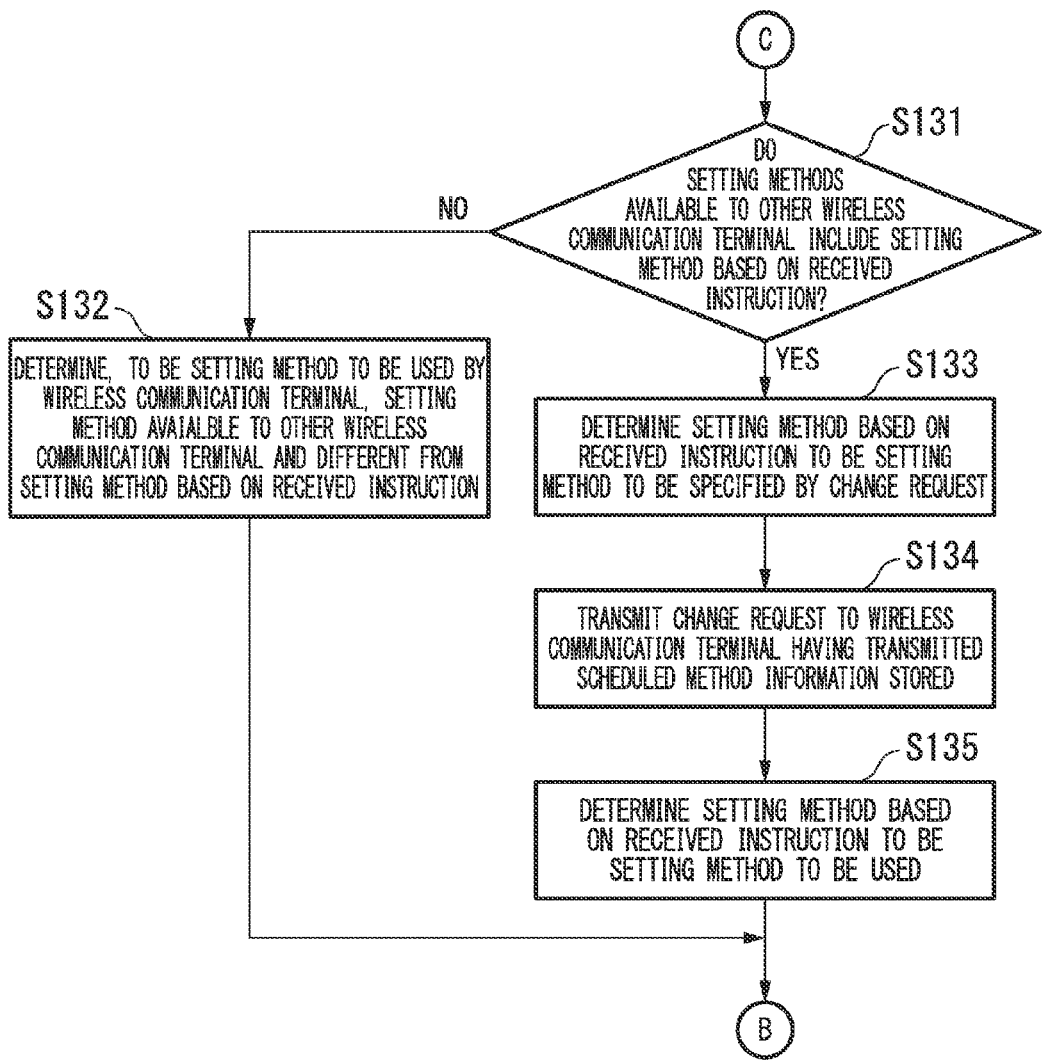
FIG. 5 is a flowchart illustrating a procedure of operation for the wireless communication terminal according to the embodiment of the present invention.

If the setting method based on the instruction received by the instruction receiver 10a is higher in priority level than the setting method indicated by the scheduled method information of the other wireless communication terminal stored in the storing unit 13 in step S119 (step S119: YES), as shown in FIG. 5, the main controller 10f compares the setting methods indicated by the available method information of the other wireless communication terminal stored in the storing unit 13, to the setting method based on the instruction received by the instruction receiver 10a. Thus, the main controller 10f determines whether or not the setting methods available to the other wireless communication terminal include the setting method based on the instruction received by the wireless communication terminal (step S131).

If any one of the setting methods indicated by the available method information of the other wireless communication terminal stored in the storing unit 13 is identical to the setting method based on the instruction received by the instruction receiver 10a, it is determined that the setting methods available to the other wireless communication terminal include the setting method based on the instruction received by the wireless communication terminal. If none of the setting methods indicated by the available method information of the other wireless communication terminal stored in the storing unit 13 is identical to the setting method based on the instruction received by the instruction receiver 10a, it is determined that the setting methods available to the other wireless communication terminal do not include the setting method based on the instruction received by the wireless communication terminal.

If the setting methods available to the other wireless communication terminal do not include the setting method based on the instruction received by the wireless communication terminal in step S131 (step S131: NO), the main controller 10f determines, to be the setting method to be used by the wireless communication terminal, the setting method indicated by the available method information of the other wireless communication terminal stored in the storing unit 13 and differing from the setting method based on the instruction received by the instruction receiver 10a (step S132). The determined setting method is reported to the changer 10c. Then, the changer 10c generates scheduled method information indicating the setting method determined in step S132 and stores the generated scheduled method information in the storing unit 13. Then, the operation proceeds to step S103 shown in FIG. 3.

If the setting methods available to the other wireless communication terminal include the setting method based on the instruction received by the wireless communication terminal in step S131 (step S131: YES), the main controller 10f determines die setting method based on the instruction received by the wireless communication terminal, to be a setting method specified by specification information to be included in a change request to be transmitted to the other wireless communication terminal (step S133).

Then, the main controller 10f instructs the communication controller 10e to transmit the change request. The communication controller 10e receiving the instruction causes the communication unit 14 to transmit the change request to the other wireless communication terminal having transmitted the scheduled method information stored in the storing unit 13 (step S134). This change request includes the specification information that specifies the setting method determined in step S133.

Then, the main controller 10f determines the setting method based on the instruction received by the instruction receiver 10a, to be the setting method to be used by the wireless communication terminal (step S135). The determined setting method is reported to the changer 10c. Then, the changer 10c generates scheduled method information indicating the setting method determined in step S135 and stores the generated scheduled method information in the storing unit 13. If the scheduled method information, of the wireless communication terminal has already been stored in the storing unit 13 in step S135, that scheduled method information is updated to the scheduled method information indicating the scheduled method determined in step S135. Then, the operation proceeds to step S103 shown in FIG. 3.

Figure 6:
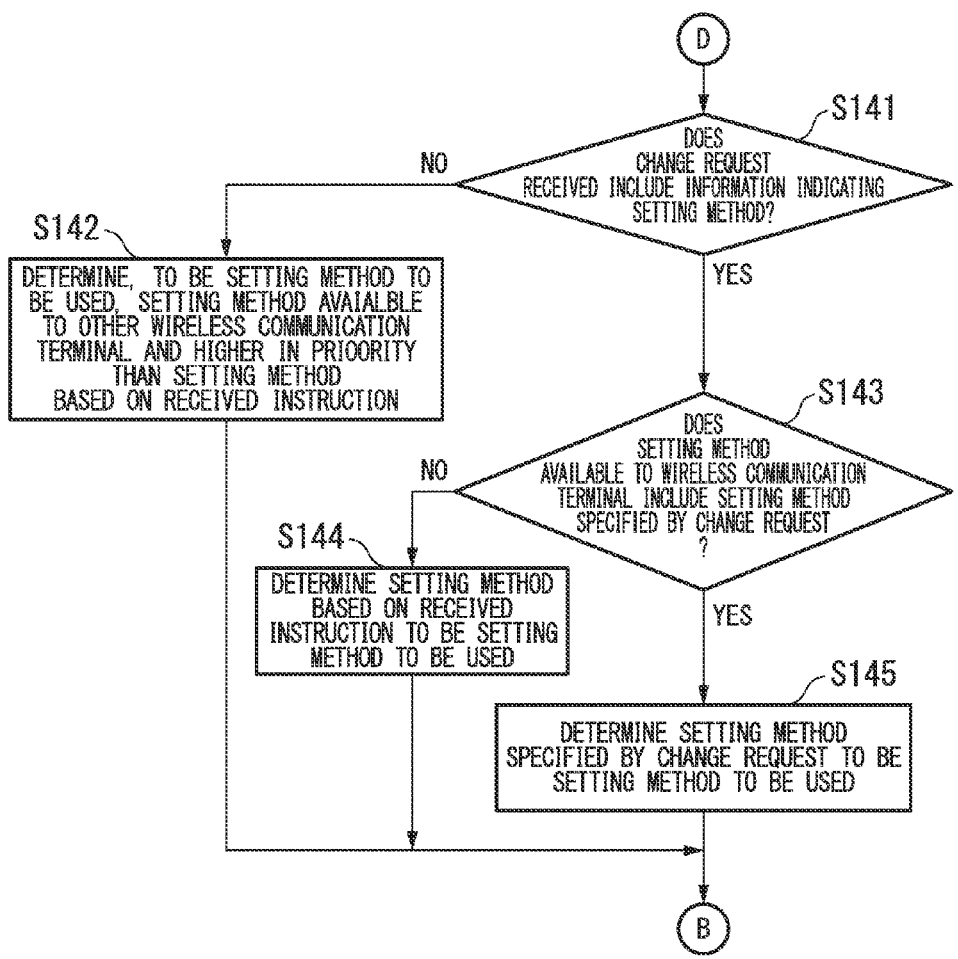
FIG. 6 is a flowchart illustrating a procedure of operation for the wireless communication terminal according to the embodiment of the present invention.
Figure 7:
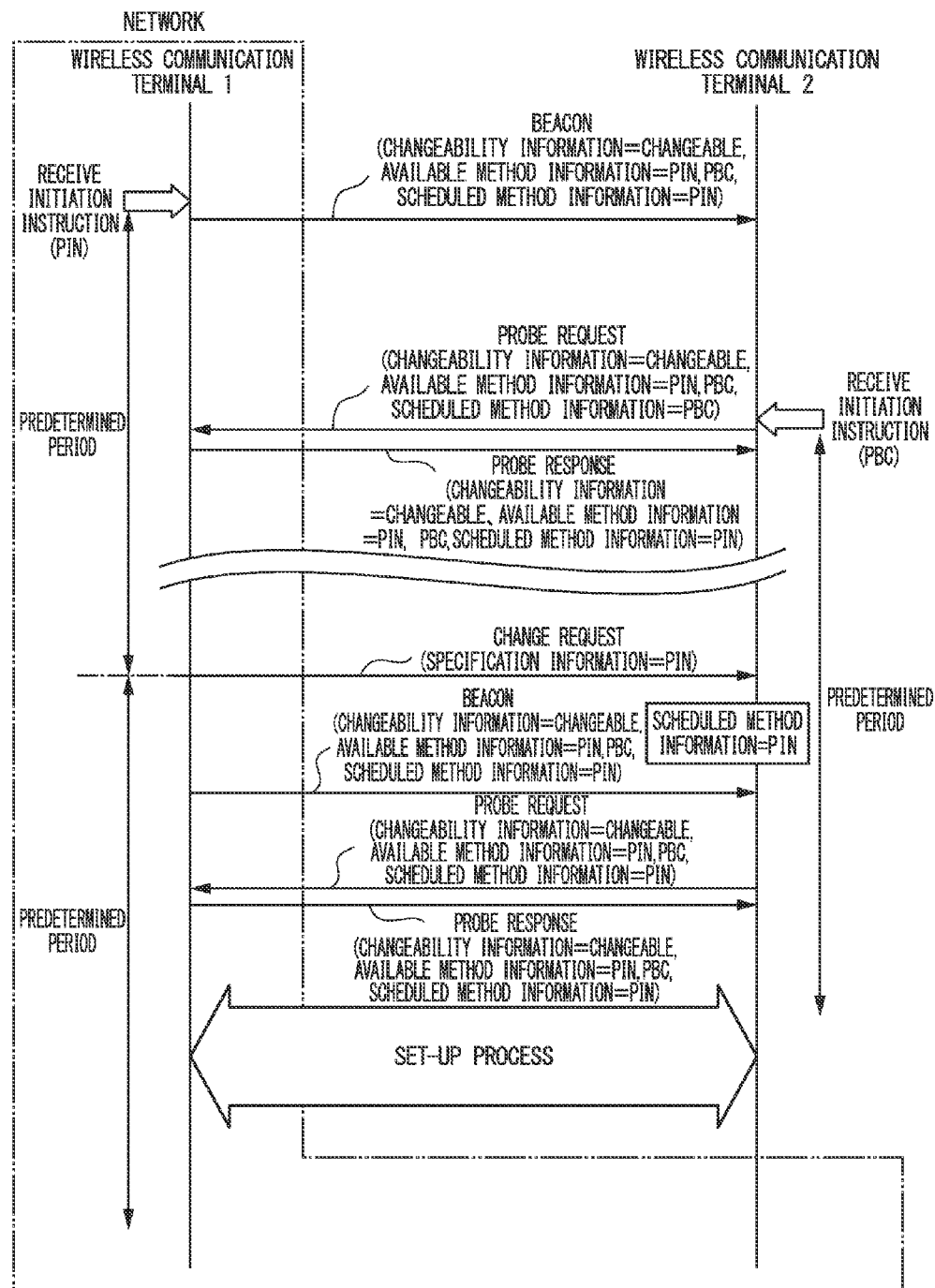
FIG. 7 is a sequence chart illustrating a procedure of operation for the wireless communication terminal according to the embodiment of the present invention.

If the change request has been received in step S111 shown in FIG. 4, as shown in FIG. 6, the main controller 10f determines whether or not the received change request includes the specification information that specifies a setting method (step S141). If the received change request does not include the specification information that specifies a setting method in step S141 (step S141: NO), the main controller 10f determines, to be the setting method to be used by the wireless communication terminal, the setting method indicated by the availability information of the other wireless communication terminal stored in the storing unit 13 and higher in priority level than the setting method based on the instruction received by the instruction receiver 10a (step S142). The determined setting method is reported to the changer 10c. Then, the changer 10c generates scheduled method information indicating the setting method, determined, in step S142 and stores the generated scheduled method information in the storing unit 13. If the scheduled method information of the wireless communication terminal has already been stored in the storing unit 13 in step S142, that scheduled method information is updated to the scheduled method information indicating the scheduled method determined in step S142. Then, the operation proceeds to step S103 shown in FIG. 3.

If the received change request includes the specification information that specifies a setting method in step S141 (step S141: YES), the main controller 10f compares the setting methods indicated by the available method information of the wireless communication terminal stored in the storing unit 13, to the setting method specified by the specification information included in the received change request. Thus, the main controller 10f determines whether or not the setting methods available to the wireless communication terminal include the setting method specified by the change request (step S143).

If any one of the setting methods indicated by the available method information of the wireless communication terminal stored in the storing unit 13 is identical to the setting method specified by the specification information included in the received change request, it is determined that the setting methods available to the wireless communication terminal include the setting method specified by the change request. If none of the setting methods indicated by the available method information of the wireless communication terminal stored in the storing unit 13 is identical to the setting method specified by the specification information included in the received change request, it is determined that the setting methods available to the wireless communication terminal do not include the setting method specified by the change request.

If the setting methods available to the wireless communication terminal do not include the setting method specified by the change request in step S143 (step S143: NO), the main controller 10f determines the setting method based on the instruction received by the instruction receiver 10a, to be the setting method to be used by the wireless communication terminal (step S144). The determined setting method is reported to the changer 10c. Then, the changer 10c generates scheduled method information indicating the setting method determined in step S144 and stores the generated scheduled method information in the storing unit 13. If the scheduled method information of the wireless communication terminal has already been stored in the storing unit 13 in step S144, that scheduled method information is updated to the scheduled method information indicating the scheduled method determined in step S144. Then, the operation proceeds to step S103 shown in FIG. 3.

If the setting methods available to the wireless communication terminal include the setting method specified by the change request in step S143 (step S143: YES), the main controller 10f determines the setting method specified by the specification information included in the change request, to be the setting method to be used by the wireless communication terminal (step S145). The determined setting method is reported to the changer 10c. Then, the changer 10c generates scheduled method information indicating the setting method determined in step S145 and stores the generated scheduled method information in the storing unit 13. If the scheduled method information of the wireless communication terminal has already been stored in the storing unit 13 in step S145, that scheduled method information is updated to the scheduled method information indicating the scheduled method determined in step S145. Then, the operation proceeds to step S103 shown in FIG. 3.

In steps S142 and S145, the setting method different from the setting method based on the instruction received from the instruction receiver 10a is determined, to be the setting method to be used by the wireless communication terminal. In other words, the setting method to be used by the wireless communication terminal is changed. Alter the steps S142 and S145, the scheduled method information is transmitted in step S104, thereby reporting to the other wireless communication terminal that the setting method has been changed. In other words, Beacon or the like to be transmitted alter the processes in steps S142 and S145 functions as a change report indicting that the setting method to be used has been changed. The change report in the first operational example includes the scheduled method information of the wireless communication terminal transmitting the change report, as the specification information that specifies the changed setting method to be used.

Hereinafter, an example of operation of the wireless communication terminal based on the operation shown in FIGS. 3 to 6 is explained. FIG. 7 illustrates operation of each wireless communication terminal in the first operation example. FIG. 7 shows a case where the wireless communication terminal 1 is present in en existing network (any one of infrastructure network or ad-hoc network), and the wireless communication terminal 2 is trying to obtain network setting information in order to participate in the network and perform data communication. This example shows a case where a user has instructed die wireless communication terminals 1 and 2 to initiate setting processes, and the firstly-set setting method to be used by the wireless communication terminal 1 differs from the firstly-set setting method to be used by the wireless communication terminal 2.

It is assumed in this example that the setting process and the set-up process follow the WPS. Additionally, it is assumed in this example that the wireless communication terminal 1 is instructed to initiate the setting process by the PIN method, and the wireless communication terminal 2 is instructed to initiate the setting process by the PBC method.

When a user instructs the wireless communication terminal 1 to initiate the setting process (corresponding to the process in step S101), the wireless communication terminal 1 determines the PIN method to be the setting method to be used (corresponding to the process in step S102). Then, the wireless communication terminal 1 initiates periodic transmission of Beacon including: the changeability information (indicating "changeable" in this example); the available method information (indicating the PIN method and the PBC method in this example); and the scheduled method information (indicating the PIN method as the result of the process in step S102) (corresponding to the processes in steps S103 and S104).

At this time, the wireless communication terminal 2 has not initiated the operation of the present embodiment. For this reason, the wireless communication terminal 1 receives none of the changeability information, the available method information, the scheduled method information, and the change request (corresponding to the processes in steps S105, S107, and S111). The wireless communication terminal 1 waits to receive those information items and the change request until a predetermined period elapses since the setting method to be used is determined in step S102.

When the user instructs the wireless communication terminal 2 to initiate the setting process (corresponding to the process in step S101), the wireless communication terminal 2 determines the PBC method to be the setting method to be used (corresponding to the process in step S102). Then, the wireless communication terminal 2 initiates periodic transmission of Beacon including: the changeability information (indicating "changeable" in this example); the available method information (indicating the PIN method and the PBC method in this example); and the scheduled method information (indicating the PBC method as the result of the process in step S102) (corresponding to the processes in steps S103 and S104).

The wireless communication terminal 1 receives Probe Request, and thereby receives the changeability information (corresponding to the process in step S105). Then, the wireless communication terminal 1 stores the changeability information, indicating "changeable" (corresponding to the process in step S106). Additionally, the wireless communication terminal 1 receives the available method information and the scheduled method information by receiving the Probe Request (corresponding to the process in step S107). The received scheduled method information indicates the PBC method, and the setting method to be used by the wireless communication terminal 1 is the PIN method (corresponding to the process in step S108). For this reason, the wireless communication terminal 1 stores the received available method information and the scheduled method information (corresponding to the process in step S110). Further, in response to the Probe Request, the wireless communication terminal 1 transmits Probe Response including the same information items as the changeability information, the available method information, and the scheduled method information.

The wireless communication terminal 2 receives the Probe Response, thereby receiving the changeability information (corresponding to the process in step S105). Therefore, the wireless communication terminal 2 stores the changeability information indicating "changeable" (corresponding to the process in step S106). Additionally, the wireless communication terminal 2 receives the available method information and the scheduled method information by receiving the Probe Response (corresponding to the process in step S107). The received scheduled method information indicates the PIN method, and the setting method to be used by the wireless communication terminal 2 is the PBC method (corresponding to the process in step S108). For this reason, the wireless communication terminal 2 stores the received available method information and the scheduled method information (corresponding to the process in step S110).

If time passes while the setting methods to be used by the two wireless communication terminals do not match, a predetermined period will elapse from the determination firstly on the side of the wireless communication terminal 1 having determined the setting method to be used (corresponding to the process in step S112). In the wireless communication terminal 1, the setting method (PBC method) indicated by the stored scheduled method information of the wireless communication terminal 2 differs from the setting method (PIN method) specified, by the user of the wireless communication terminal 1 (corresponding to the process in step S113). Additionally, the stored changeability information of the wireless communication terminal 2 indicates "changeable" (corresponding to the process in step S115).

Here, if security is regarded as the reference for the priority level, the setting method (PIN method) specified by the user of the wireless communication terminal 1 is higher in security level than the setting method (PBC method) indicated by the scheduled method information of the wireless communication terminal 2 stored by the wireless communication terminal 1 (corresponding to the process in step S119). Additionally, the setting methods (the PBC method and the PIN method) indicated by the available method information of the wireless communication terminal 2 stored by the wireless communication terminal 1 includes the setting method (PIN method) specified by the user of the wireless communication terminal 1 (corresponding to the process in step S131). For this reason, the wireless communication terminal 1 transmits to the wireless communication terminal 2, the change request including the specification information that specifies the setting method (PIN method) specified by the user of the wireless communication terminal 1 (corresponding to the processes in step S133 and S134). Then, the wireless communication terminal 1 determines the setting method (PIN method) specified by the user, to be the setting method to be used by the wireless communication terminal 1 (corresponding to the process in step S135). The wireless communication terminal 1 does not change the setting method to be used.

The wireless communication terminal 2 receives from the wireless communication terminal 1, the change request including the specification information that specifies the setting method (PIN method) (corresponding to the processes in step S111 and S141). The setting methods (the PIN method and the PBC method) indicated by the available method information of the wireless communication terminal 2 include the setting method (PIN method) specified by the specification information included in the change request (corresponding to the process in step S143). For this reason, the wireless communication terminal 2 determines, to be the setting method to be used, the PIN method that is the setting method specified by the specification information included in the change request (corresponding to the process in step S145). Thus, the wireless communication terminal 2 changes the setting method to be used, and changes to the PIN method, the setting method indicated by the scheduled method information included in Probe Request (change report) periodically transmitted by the wireless communication terminal 2 (corresponding to the process in step S104).

The wireless communication terminal 1 receives Probe Request, thereby receiving the changeability information and the scheduled method information (corresponding to the process in step S107). The received scheduled method information indicates the PIN method, which is identical to the setting method to be used by the wireless communication terminal 1 (corresponding to the process in step S108). For this reason, the wireless communication terminal 1 performs the setting process using the password generated based on the matched setting method (PIN method) (corresponding to the process in step S109). Additionally, in response to the Probe Request, the wireless communication terminal 1 transmits Probe Response including the same information items as the changeability information, the available method information, and the scheduled method information.

The wireless communication terminal 2 receives the Probe Response, thereby receiving the changeability information and the scheduled method information (corresponding to the process in step S107). The received scheduled method information indicates the PIN method, which is identical to the setting method to be used by the wireless communication terminal 2 (corresponding to the process in step S108). For this reason, the wireless communication terminal 2 performs the setting process using the password generated based on the matched setting method (PIN method) (corresponding to the process in step S109).

By the above processes, the setting method to be used by the wireless communication terminals 1 and 2 become identical, thereby making it possible to successfully perform the set-up process.

SECOND OPERATIONAL EXAMPLE

Figure 10:
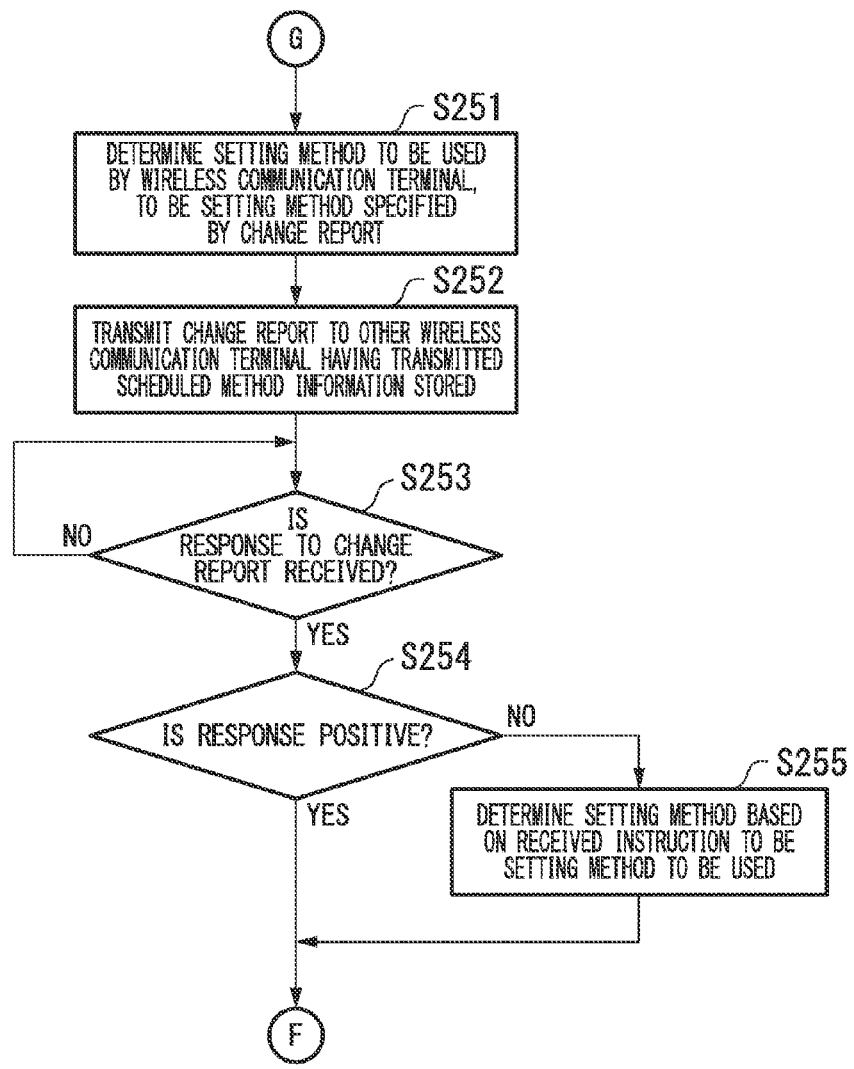
FIG. 10 is a flowchart illustrating a procedure of operation for the wireless communication terminal according to the embodiment of the present invention.
Figure 11:
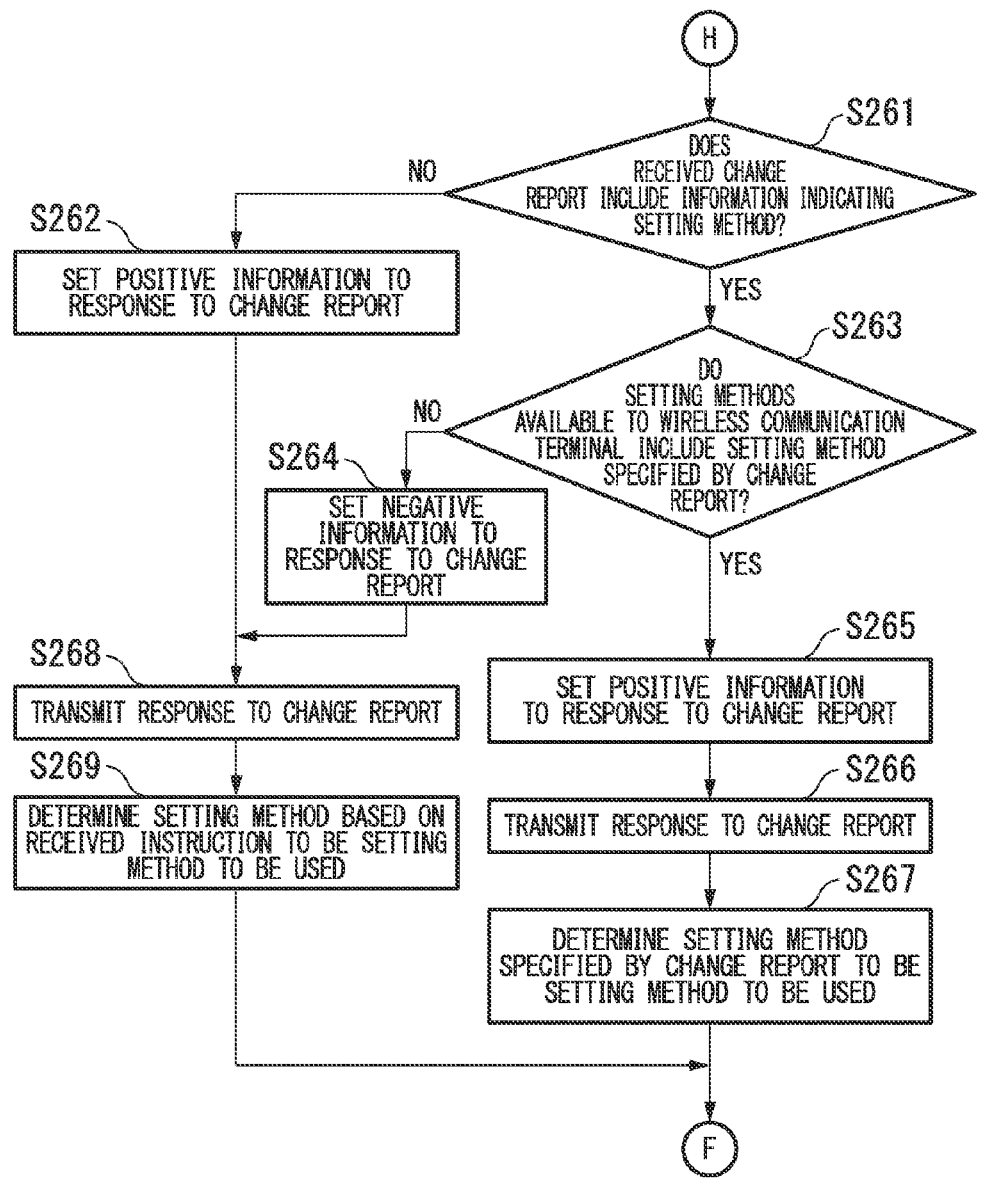
FIG. 11 is a flowchart illustrating a procedure of operation for the wireless communication terminal according to the embodiment of the present invention.
Figure 12:
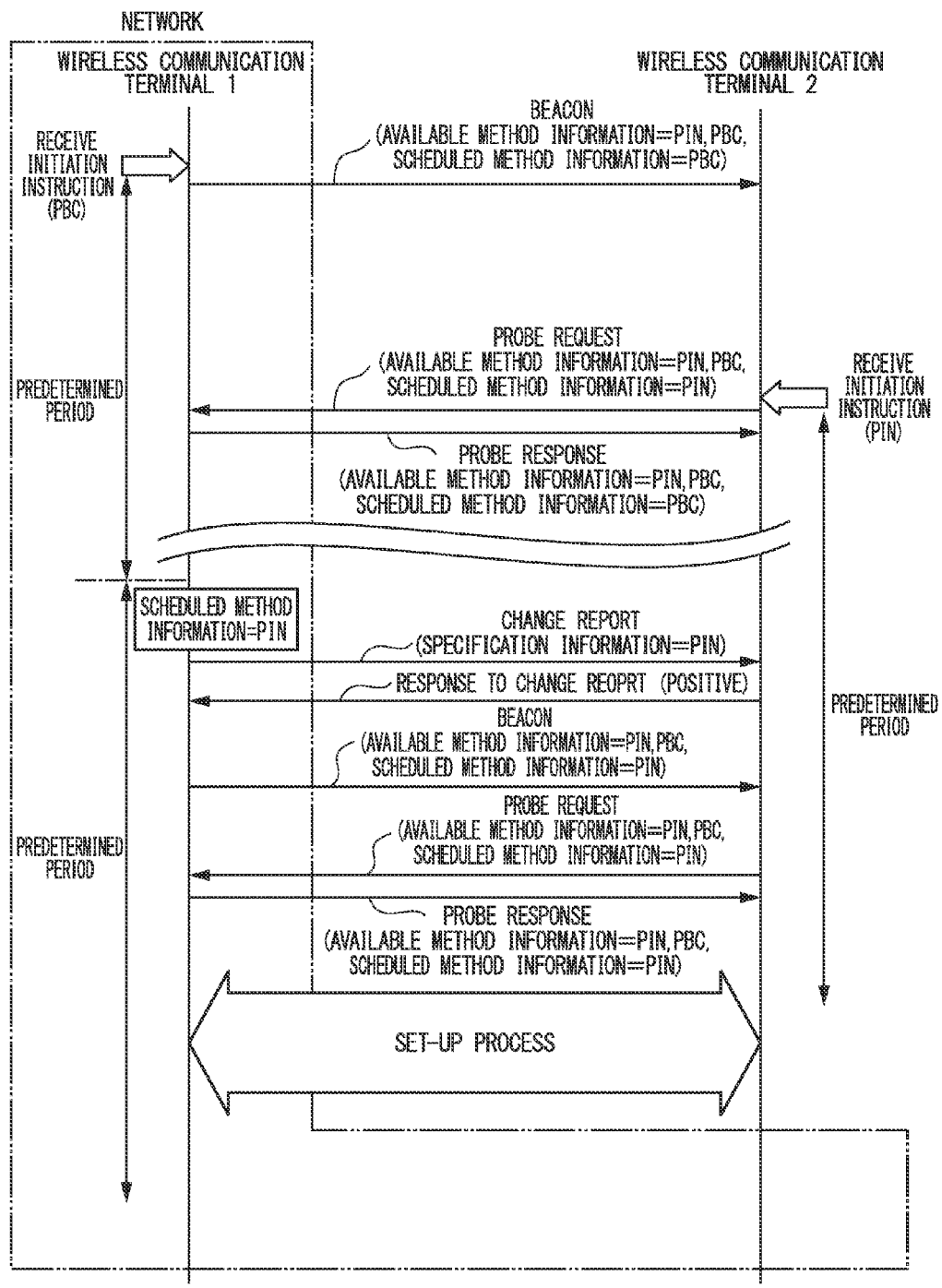
FIG. 12 is a flowchart illustrating a procedure of operation for the wireless communication terminal according to the embodiment of the present invention.

Hereinafter, a second operational example is explained here with reference to FIGS. 8 to 12, FIGS. 8 to 11 illustrate the detailed operational procedure for the wireless communication terminal. FIG. 12 illustrates a specific example of operation based on the operation shown in FIGS. 8 to 11. The operation shown in FIGS. 8 to 11 will be well understood after referring to FIG. 12.

Figure 8:
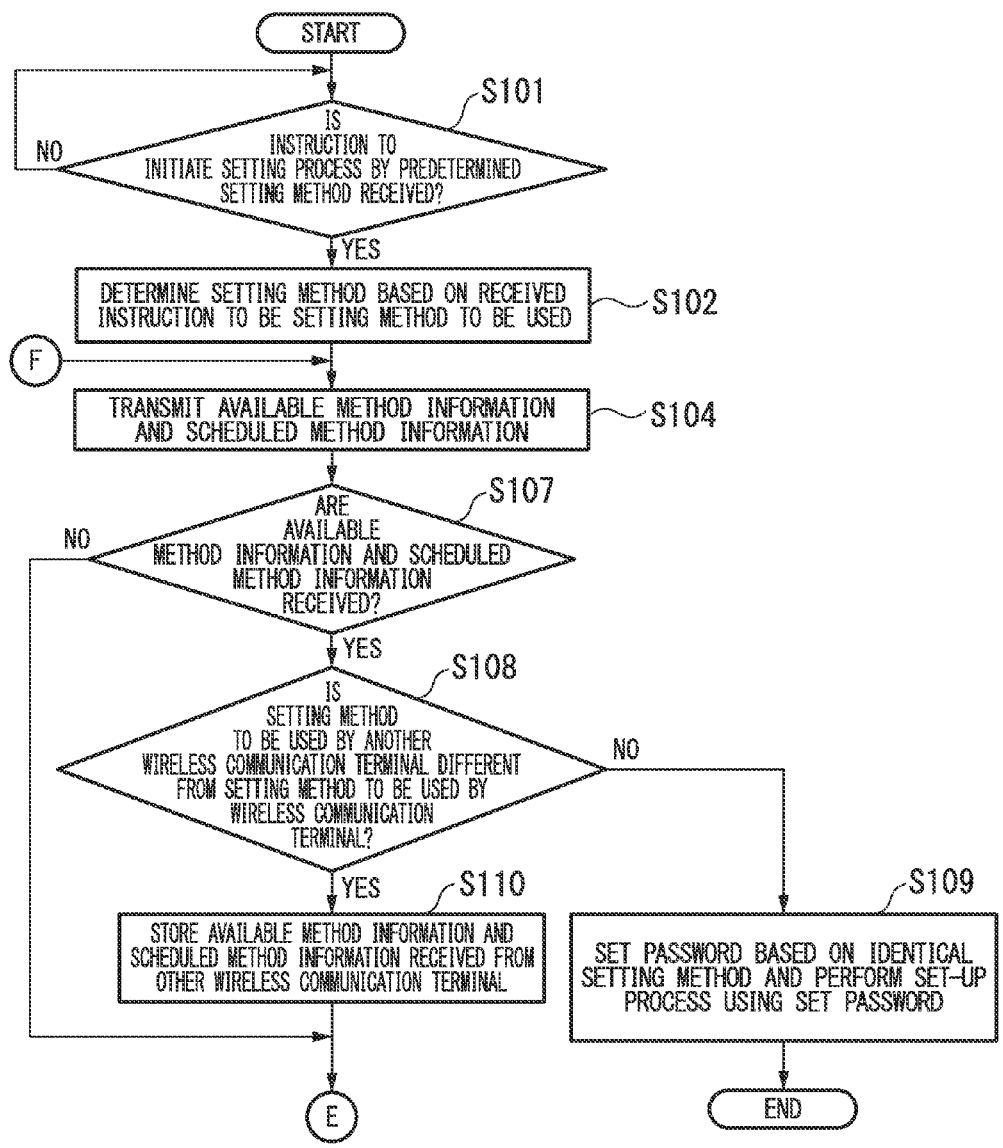
FIG. 8 is a flowchart illustrating a procedure of operation for the wireless communication terminal according to the embodiment of the present invention.

The operation shown in FIG. 8 are obtained by removing from the operation in shown in FIG. 3, the processes in steps S103, S105, and S106. In other words, after step S104, the operation proceeds to step S107. The operation shown in FIG. 8 has been explained in the first, operational example, and therefore explanations thereof are omitted there.

Figure 9:
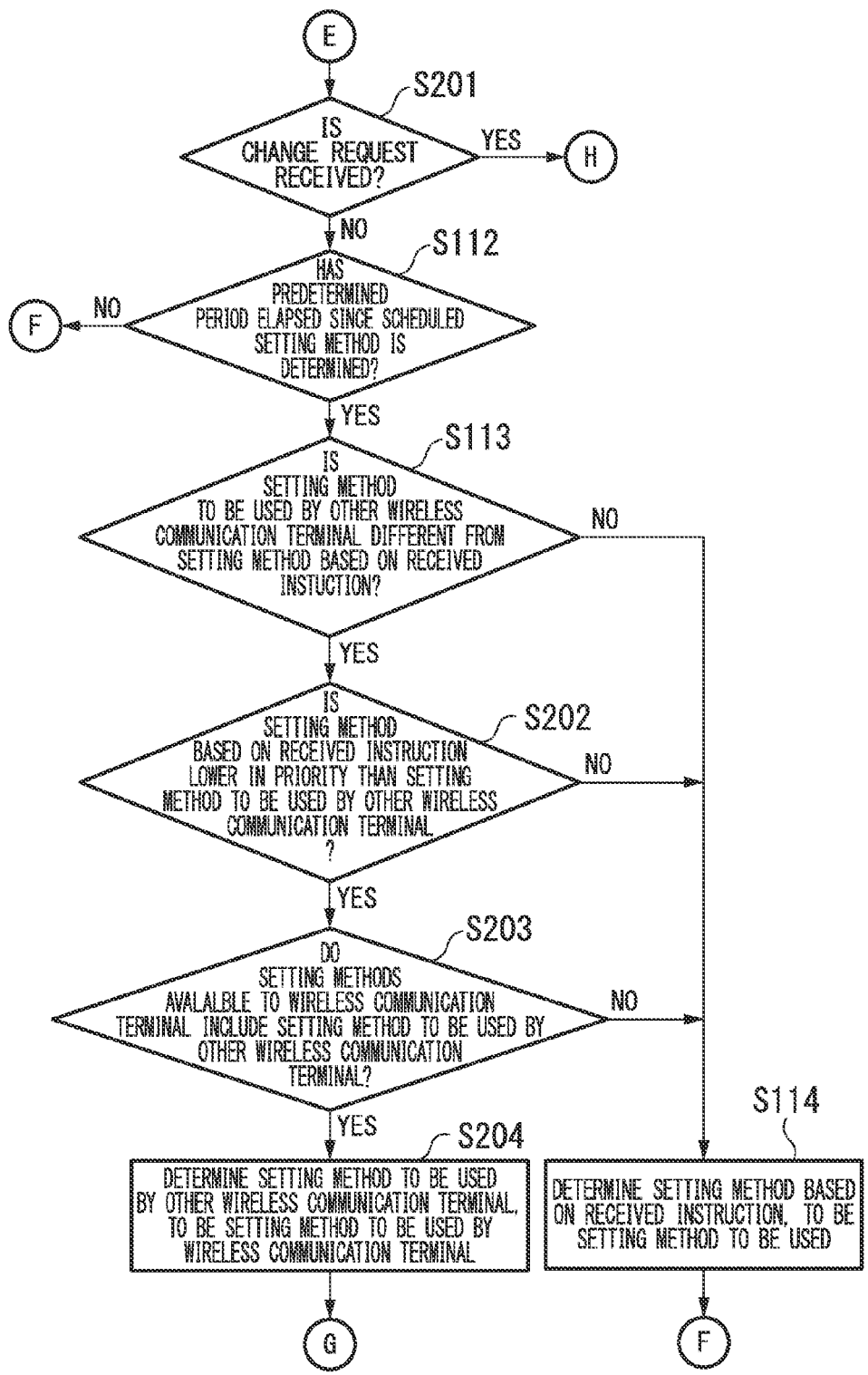
FIG. 9 is a flowchart illustrating a procedure of operation for the wireless communication terminal according to the embodiment of the present invention.

If necessary information has not been received in step S107 (step S107: NO), or after the process in step S110, the operation, proceeds to step S201, shown in FIG. 9. As shown in FIG. 9, the main controller 10f determines whether or not a change report is received from the other wireless communication terminal (step S201). The change report includes specification information that specifies the changed setting method to be used by the other wireless communication terminal having transmitted the change report. Additionally, the change report indicates that the setting method to be used by the other wireless communication terminal has been changed. If the change report has been received in step S201 (step S201: YES), the operation proceeds to step S261 shown in FIG. 11. If the change report has not been received in step S201 (step S201: NO), the main controller 10f determines whether or not a predetermined period has elapsed since the setting method to be used has been determined previously (step S112).

If the predetermined period has not elapsed since the setting method to be used has been previously determined in step S112 (step S112: NO), the operation proceeds to step S104 shown in FIG. 8. If the predetermined period has elapsed since the setting method to be used has been previously determined in step S112 (step S112: YES), the main controller 10f compares the setting method indicated by the scheduled method information of the other wireless communication terminal stored in the storing unit 13 to the setting method based on the instruction received by the instruction receiver 10a of the wireless communication terminal. Thus, the main controller 10f determines whether or not the setting method to be used by the other wireless communication terminal differs from the setting method based on the instruction received by the wireless communication terminal (step S113).

If the setting method indicated by the scheduled method information of the other wireless communication terminal stored in the storing unit 13 is not identical to the setting method based on the instruction received by the instruction receiver 10a of the wireless communication terminal, it is determined that the setting method to be used by the other wireless communication terminal differs from the setting method based on the instruction received by the wireless communication terminal if the setting; method indicated by the scheduled method information of the other wireless communication terminal stored in the storing unit 13 is identical to the setting method based on the instruction received by the instruction receiver 10a of the wireless communication terminal, it is determined that the setting method to be used by the other wireless communication terminal is identical to the setting method based on the instruction received by the wireless communication terminal. If the scheduled method information has not been received from the other wireless communication terminal, and if the scheduled method information of the other wireless communication terminal is not stored in the storing unit 13, it is determined that there is no scheduled method information of the other wireless communication terminal.

In step S113, if the setting method to be used by the other wireless communication terminal is identical to the setting method based on the instruction received by the wireless communication terminal, or if there is no scheduled method information of the wireless communication terminal (step S113: NO), the controller 10f determines the setting method based on the instruction received by the instruction receiver 10a, to be the setting method to be used by the wireless communication terminal (step S114). The determined setting method is reported to the changer 10c. Then, the changer 10c generates scheduled method information indicating the setting method determined in step S114. Then, the generated scheduled method information is stored in the storing unit 13. If it is determined in step S114 that the scheduled method information of the wireless communication terminal has already been stored in the storing unit 13, that scheduled method information is updated to the scheduled method information indicating the scheduled method determined in step S114. Then, the operation proceeds to step S104 shown in FIG. 8.

If the setting method to be used by the other wireless communication terminal differs from the setting method based on the instruction received by the wireless communication terminal in step S113 (step S113: YES), the controller 10f determines whether or not the setting method based on the instruction received by the instruction receiver 10a is lower in priority level than the setting method indicated by the scheduled method information of the other wireless communication terminal stored in the storing unit 13 (step S202).

The priority level is similar to that in the first operational example. For example, if security is regarded as a reference for the priority level, the priority level of the PIN method may be set to be higher than the priority level of the PBC method. Alternatively, if convenience for users is regarded as a reference, the priority level of the PBC method may be set to be higher than the priority level of the PIN method.

If the setting method based on the instruction received by the instruction receiver 10a is equal in priority level to, or higher in priority level than the setting method indicated by the scheduled method information of the other wireless communication terminal stored in the storing unit 13 in step 202 (step S202: NO), the operation proceeds to step S114. If the setting method based on the instruction received by the instruction receiver 10a is lower in priority level than the setting method indicated by the scheduled method information of the other wireless communication terminal stored in the storing unit 13 in step 202 (step S202: YES), the main controller 10f compares the setting methods indicated by the available method information of the wireless communication terminal stored in the storing unit 13, to the setting method indicated by the scheduled method information of the other wireless communication terminal stored in the storing unit 13. Thus, the main controller 10f determines whether or not the setting methods available to the wireless communication terminal include the setting method to be used by the other wireless communication terminal (step S203).

If any one of the setting methods indicated by the available method information of the wireless communication terminal stored in the storing unit 13 is identical to the setting method indicated by the scheduled method information of the other wireless communication terminal stored in the storing unit 13, it is determined that the setting methods available to the wireless communication terminal include the setting method to be used by the other wireless communication terminal. If none of the setting methods indicated by the available method information of the wireless communication terminal stored in the storing unit 13 is identical to the setting method indicated by the scheduled method information of the other wireless communication terminal stored in the storing unit 13, it is determined that the setting methods available to the wireless communication terminal do not include the setting method to be used by the other wireless communication terminal.

If the setting methods available to the wireless communication terminal do not include the setting method to be used by the other wireless communication terminal in step S203 (step S203: NO), the operation proceeds to step S114. If the setting methods available to the wireless communication terminal include the setting method to be used by the other wireless communication terminal in step S203 (step S203: YES), the main controller 10f determines, to be the setting method to be used by the wireless communication terminal, the setting method indicated by the scheduled method information of the other wireless communication terminal stored in the storing unit 13 (step S204). The determined setting method is reported to the changer 10c. Then, the changer 10c generates scheduled method information indicating the setting method determined in step S204 and stores the generated scheduled method information in the storing unit 13. If the scheduled method information of the wireless communication terminal has already been stored in the storing unit 13 in step S204, that scheduled method information is updated to the scheduled method information indicating the scheduled method determined in step S204.

Then, as shown in FIG. 10, the main controller 10f determines the setting method indicated by the scheduled method information of the wireless communication terminal stored in the storing unit S3, to be a setting method specified by specification information to be included in a change report to be transmitted to the other wireless communication terminal (step S251). Then, the main controller 10f instructs the communication controller 10e to transmit the change report. The communication controller 10e receiving the instruction causes the communication unit 14 to transmit the change report to the other wireless communication terminal having transmitted the scheduled method information stored in the storing unit 13 (step S252). This change report includes the specification information that specifies the setting method determined in step S251.

Then, the main controller 10f determines whether or not a response to the change report is received from the other wireless communication terminal (step S253). If the change request has not been received in step S253 (step S253: NO), the determination in step S253 is performed again. If a response to the change report has been received in step S253 (step S253: YES), the main controller 10f determines whether or not the received response includes information indicating acknowledgment (step S254).

If the received response includes information indicating acknowledgment in step S254 (step S254: YES), the operation proceeds to step S104 shown in FIG. 8. If the response does not include information indicating acknowledgment in step S254 (step S254: NO), the main controller 10f determines the setting method based on the instruction received by the instruction receiver 10a, to be the setting method to be used by the wireless communication terminal (step S255). The determined setting method is reported to the changer 10c. Then, the changer 10c generates scheduled method information indicating the setting method determined in step S255 and stores the generated scheduled method information in the storing unit 13. If the scheduled method information of the wireless communication terminal has already been stored in the storing unit 13 in step S255, that scheduled method information is updated to the scheduled method information indicating the scheduled method determined in step S255. Then, the operation proceeds to step S104 shown in FIG. 8.

If the change report has been received in step S201 shown in FIG. 9 (step S201: YES), as shown in FIG. 11, the main controller 10f determines whether or not the received change report includes specification information that specifies a setting method (step S261). If the received change report does not include the specification information that specifies a setting method in step S261 (step S261: NO), the main controller 10*f* set information indicating acknowledgment to a response to the change report (step S262). Then, the main controller 10*f* instructs the communication controller 10*e* to transmit the response to the change report. The communication controller 10*e* receiving the instruction causes the communication unit 14 to transmit the response to the other wireless communication terminal having transmitted the change report (step S268).

Then, the main controller 10*f* determines the setting method based on the instruction received by the instruction receiver 10*a*, to be the setting method to be used by the wireless communication terminal (step S269). The determined setting method is reported to the changer 10*c*. Then, the changer 10*c* generates scheduled method information indicating the setting method determined in step S269 and stores the generated scheduled method information in the storing unit 13. If the scheduled method information of the wireless communication terminal has already been stored in the storing unit 13 in step S269, that scheduled method, information is updated to the scheduled method information indicating the scheduled method determined in step S269. Then, the operation proceeds to step S104 shown in FIG. 8.

If the received change report includes the specification information that specifies a setting method in step S261 (step S261: YES), the main controller 10*f* compares the setting methods indicated by the available method information of the wireless communication terminal stored in the storing unit 13, to the setting method specified by the specification information included in the received change report. Thus, die main controller 10*f* determines whether or not the setting methods available to the wireless communication terminal include the setting method specified by the change report (step S263).

If any one of the setting methods indicated by the available method information of the wireless communication terminal stored in the storing unit 13 is identical to the setting method specified by the specification information included in the received change report, it is determined that the setting methods available to the wireless communication terminal include the setting method specified by the change report. If none of the setting methods indicated by the available method information of the wireless communication terminal stored in the storing unit 13 is identical to the setting method specified by the specification information included in the received change report, it is determined that the setting methods available to the wireless communication terminal do not include the setting method specified by the change report.

If the setting methods available to the wireless communication terminal do not include the setting method specified by the change report in step S263 (step S263: NO), the main controller 10*f* sets information indicating; non-acknowledgment to a response to the change report (step S264). Then, the operation proceeds to step S268.

If the setting methods available to the wireless communication terminal include the setting method specified by the change report in step S263 (step S263: YES), the main controller 10*f* sets information indicating acknowledgment to a response to the change report (step S265). Then, the main controller 10*f* instructs the communication controller 10*e* to transmit the response to the change report. The communication controller 10*e* receiving the instruction causes the communication unit 14 to transmit the response to the other wireless communication terminal having transmitted the change report (step S266). Then, the main controller 10*f* determines the setting method specified by the specification information included in the change report, to be the setting method to be used by the wireless communication terminal (step S267). The determined setting method is reported to the changer 10*c*.

Then, the changer 10*c* generates scheduled method information indicating the setting method determined in step S267 and stores the generated scheduled method information in the storing unit 13. If the scheduled method information of the wireless communication terminal has already been stored in the storing unit 13 in step S267, that scheduled method information is updated to the scheduled method information indicating the scheduled method determined in step S267. Then, the operation proceeds to step S104 shown in FIG. 8.

Hereinafter, an example of operation of the wireless communication terminal based on the operation shown in FIGS. 8 to 11 is explained. FIG. 12 illustrates operation of each wireless communication terminal in the second operation example, FIG. 12 shows a case where the wireless communication terminal 1 is present in an existing network (any one of infrastructure network or ad-hoc network), and the wireless communication terminal 2 is trying to obtain network setting information in order to participate in the network and perform data communication. This example shows a case where a user has instructed the wireless communication terminals 1 and 2 to initiate setting processes, and the firstly-set setting method to be used by the wireless communication terminal 1 differs from die firstly-set setting method to be used by the wireless communication terminal 2.

It is assumed in this example drat the setting process and the set-up process follow the WPS. Additionally, it is assumed in this example that the wireless communication terminal 1 is instructed to initiate the setting process by the PBC method, and the wireless communication terminal 2 is instructed to initiate the setting process by the PIN method.

When a user instructs the wireless communication terminal 1 to initiate the setting process (corresponding to the process in step S101), the wireless communication terminal 1 determines the PBC method to be the setting method to be used (corresponding to the process in step S102). Then, the wireless communication terminal 1 initiates periodic transmission of Beacon including: available method information (indicating the PIN method and the PBC method in this example); and scheduled method information (indicating the PBC method as the result of the process in step S102 in this example) (corresponding to the processes in steps S103 and S104).

At this time, the wireless communication terminal 2 has not initiated the operation of the present embodiment. For this reason, the wireless communication terminal 1 receives none of the available method information, the scheduled method information, and the change report (corresponding to the processes in steps S107 and S201). The wireless communication terminal 1 waits to receive those information items and the change report until a predetermined period elapses since the setting method to be used is determined in step S102.

When the user instructs the wireless communication terminal 2 to initiate the setting process (corresponding to the process in step S101), the wireless communication terminal 2 determines the PIN method to be the setting method to be used (corresponding to the process in step S102). Then, the wireless communication terminal 2 initiates periodic transmission of Probe Request including: the available method information (indicating the PIN method and the PBC method in this example); the scheduled method information (indicating the PIN method as the result of the process in step S102 in this example) (corresponding to the processes in steps S103 and S104).

The wireless communication terminal 1 receives Probe Request, and thereby receives the available method information and the scheduled method information (corresponding to the process in step S107). The received scheduled method information indicates the PIN method, and the setting method to be used by the wireless communication terminal 1 is the PBC method (corresponding to the process in step S108). For this reason, the wireless communication terminal 1 stores the received available method information and scheduled method information (corresponding to the process in step S110). Further, in response to the Probe Request, the wireless communication terminal 1 transmits Probe Response including the same information items as the available method information and the scheduled method information.

The wireless communication terminal 2 receives the Probe Response, thereby receiving the available method information and the scheduled method information (corresponding to the process in step S107). The received scheduled method information indicates the PBC method, and the setting method to be used by the wireless communication terminal 2 is the PIN method (corresponding to the process in step S108). For this reason, the wireless communication terminal 2 stores the received available method information and the scheduled method information (corresponding to the process in step S110).

If time passes while the setting methods to be used by the two wireless communication terminals do not match, a predetermined period will elapse since the determination has been made firstly on the side of the wireless communication terminal 1 having determined the setting method to be used (corresponding to the process in step S112). In the wireless communication terminal 1, the setting method (PIN method) indicated by the stored scheduled method information of the wireless communication terminal 2 differs from the setting method (PBC method) specified by the user of the wireless communication terminal 1 (corresponding to the process in step S113).

Here, if security is regarded as a reference for the priority level, the setting method (PBC method) specified by the user of the wireless communication terminal 1 is lower in security level than the setting method (PIN method) indicated by the scheduled method information of the wireless communication terminal 2 stored by the wireless communication terminal 1 (corresponding to the process in step S202). Additionally, the setting methods (the PIN method and the PBC method) available to the wireless communication terminal 1 includes the setting method (PIN method) indicated by the scheduled method information of the wireless communication terminal 2 stored in the wireless communication terminal 1 (corresponding to the process in step S203). For this reason, die wireless communication terminal 1 changes the setting method to be used by the wireless communication terminal 1 to the setting method (PIN method) indicated by the scheduled method information of the wireless communication terminal 2 stored in the wireless communication terminal 1 (corresponding to the process in step S204). Then, the wireless communication terminal 1 transmits to the wireless communication terminal 2, the change report including the specification information that specifies the setting method (PIN method) to be used by the wireless communication terminal 1 (corresponding to the processes in step S251 and S252).

The wireless communication terminal 2 receives from the wireless communication terminal 1, the change report including the specification information that specifies the setting method (PIN method) (corresponding to the processes in step S201 and S261). The setting methods (the PIN method and the PBC method) indicated by the available method information of the wireless communication terminal 2 include the setting method (PIN method) specified by the specification information included in the change report (corresponding to the process in step S263). For this reason, the wireless communication terminal 2 transmits a response to the change report, which includes information indicating acknowledgment (corresponding to the processes in steps S265 and S266). Thus, the wireless communication terminal 2 determines the PIN method that is the setting method specified by the specification information included in the change report, to be the setting method to be used by the wireless communication terminal 2 (corresponding to the process in step S267). The setting method (PIN method) determined here is identical to the setting method (PIN method) specified by the user of the wireless communication terminal 2.

The wireless communication terminal 1 receives the response to the change report (corresponding to the process in step S253). The response to the change report includes the information indicating acknowledgement (corresponding to the process in step S254). The setting method indicated by the scheduled method information included in the Beacon and the Probe Response periodically transmitted by the wireless communication terminal 1 is changed to die PIN method (corresponding to the process in step S104).

The wireless communication terminal 1 receives Probe Request, thereby receiving the available method information and the scheduled method information (corresponding to the process in step S107). The received scheduled method information indicates the PIN method, which is identical to the setting method to be used by the wireless communication terminal 1 (corresponding to the process in step S108). For this reason, the wireless communication terminal 1 performs a set-up process using the password generated based on the matched setting method (PIN method) (corresponding to the process in step S109). Additionally, in response to the Probe Request, the wireless communication terminal 1 transmits Probe Response including the same information items as the available method information and the scheduled method information included in the Beacon.

The wireless communication terminal 2 receives the Probe Response, thereby receiving the available method information and the scheduled method information (corresponding to the process in step S107). The received scheduled method information indicates the PIN method, which is identical to the setting method to be used by the wireless communication terminal 2 (corresponding to the process in step S108). For this reason, the wireless communication terminal 2 performs a set-up process using the password generated based on the matched setting method (PIN method) (corresponding to the process in step S109).

By the above operation, the setting methods to be used by the wireless communication terminals 1 and 2 become identical, thereby making it possible to successfully perform the set-up process.

As explained above, in the first operational example, if the setting method to be used by the wireless communication terminal 1 differs from the setting method to be used by the wireless communication terminal 2 that is to communicate with the wireless communication terminal 1 (corresponding to the process in step S113), the wireless communication terminal 1 transmits a change request (corresponding to the process in step S134). The wireless communication terminal 2 receiving the change request changes the setting method to be used by the wireless communication terminal 2 (corresponding to the processes in steps S142 and S145), thereby making it possible to enhance the success probability of lite set-up process. In the second operational example, if the setting method to be used by the wireless communication terminal 1 differs from the setting method to be used by the wireless communication terminal 2 that is to communicate with the wireless communication terminal 1 (corresponding to the process in step S113), the wireless communication terminal 1 changes the setting method to be used by the wireless communication terminal 1, and transmits a change report (corresponding to the process in step S252). The wireless communication terminal 2 confirms that the change report has been received (steps S201, S266, and S268), thereby making it possible to enhance the success probability of the set-up process.

In the first operational example, the change request includes specification information that specifies the changed setting method to be used (corresponding to the process in step S133). Thus, it is possible to specify the changed setting method, thereby making it possible to enhance the success probability of the set-up process.

In the first operational example, if the setting method to be used by the wireless communication terminal 1 differs from the setting method to be used by the wireless communication terminal 2 that is to communicate with the wireless communication terminal 1 (corresponding to the process in step S113), the wireless communication terminal 1 determines whether or not it is possible for the wireless communication terminal 2 to change the setting method based on the changeability information of the wireless communication terminal 2 (corresponding to the process in step S115). As a result of the determination, if it is possible for the wireless communication terminal 2 to change the setting method, the wireless communication terminal 1 transmits a change request to the wireless communication terminal 2 (corresponding to the process in step S134). If it is not possible for the wireless communication terminal 2 to change the setting method, the wireless communication terminal 1 changes the setting method to be used by the wireless communication terminal 1 (corresponding to the processes in steps S117 and S118). Thus, a change request is not transmitted, to the wireless communication terminal 2 that cannot change the setting method to be used, thereby making it possible to successfully perform a luster set-up process.

In the first operational example, the wireless communication terminal instructed to perform the setting process based on the setting method with the higher priority level transmits a change request (corresponding to the processes in step S119 and S134). Then, the wireless communication terminal receiving the change request changes the setting method to be used, to a setting method with the higher priority level (corresponding to the processes in step S142 and S145). Thus, a setting process based on a setting method with the higher security or a setting method with the higher convenience can be initiated, thereby making it possible to enhance the success probability of the set-up process.

in the second operational example, a change report is transmitted and received between two wireless communication terminals that are to wirelessly communicate with each other. Thus, each of the two wireless communication terminals can set the timing of initiating the setting process, thereby making it possible to successfully perform a faster set-up process without generating a wasteful waiting period.

In the second operational example, the wireless communication terminal 1 having transmitted the change report receives from the wireless communication terminal 2, the response including information indicating acknowledgment (corresponding to the processes in step S253 and S254). Thereafter, the wireless communication terminal 1 performs the setting process and the set-up process (corresponding to the process in step S109). Further, the wireless communication terminal 2 receiving the change report determines whether or not to accept the change of the setting method to be used by the wireless communication terminal 1 (corresponding to the processes in step S261 and S263). If the wireless communication terminal 2 accepts the change of the setting method to be used by the wireless communication terminal 1, the wireless communication terminal 2 transmits a response including acknowledgment (corresponding to the process in step S266). Thereafter, the wireless communication terminal 2 performs the setting process and the set-up process (corresponding to the process in step S109). Thus, the setting process and the set-up process are performed if the two wireless communication terminals 1 and 2 agree to the change of the setting method to be used, thereby making it possible to enhance the success probability of the set-up process.

In the second operational example, the change report includes specification information that specifies the changed setting method to be used (corresponding to the process in step S251). The wireless communication terminal receiving the change report determines based on the setting method specified by the change report, whether or not to accept the change of the setting method to be used by the wireless communication terminal 1 (corresponding to the processes in step S261 and S263). Thus, it is possible to enhance the success probability of the set-up process.

In the second operational example, the wireless communication instructed to perform a setting method with the lower priority level changes the setting method to be used (corresponding to the processes in step S202 and S204), and transmits a change report (corresponding to the process in step S252). Thus, it is possible to initiate a setting process based on a setting method with the higher security or a setting method with the higher convenience, thereby enhancing the success probability of the set-up process.

A computer readable recording medium (corresponding to the storing unit 13 of the present embodiment) may record a program for implementing all or part of the operations and functions of the wireless communication device according to the present embodiments, so that the wireless communication device of the present embodiments can be implemented by a computer reading and executing the program recorded in the recording medium.

Here, the "computer" includes a homepage provision environment (or display environment) in a case where a WWW system is used. Additionally, the "computer readable recording medium" includes a portable medium such as a flexible disc, a magneto-optical disc, a ROM, or a CD-ROM, and a storage device such as a hard disk built in the computer system. The "computer readable recording medium" may include a medium that stores a program for a predetermined period of time, such as a volatile memory (RAM) built in a computer system serving as a server or client in a case where a program is transmitted via a network such as the Internet or a communication line such as a telephone line.

Additionally, the above program may be transmitted from a computer included in a memory device or the like storing that program to another computer via a transmission medium or transmission waves in the transmission medium. Here, the "transmission medium" means a medium with a function of transmitting information, such as a network such as the Internet or a communication line such as a telephone line. Further, the program may be a program for implementing part of the aforementioned functions. Moreover, the program may be a program that can implement the aforementioned functions in combination with a program already recorded on the computer system, that is, the difference file (difference program).

Although the embodiments of the present invention have been explained above, it is apparent that the present invention is not limited to the above embodiments, and may be modified and changed without departing from the scope and spirit of the invention.

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

What is claimed is:

1. A first wireless communication terminal comprising:
   a communication unit configured to wirelessly communicate with a second wireless communication terminal;
   a receiving unit configured to receive an instruction to initiate a setting process of setting unique information to be used for a first encrypted communication with the second wireless communication terminal;
   a setting unit configured to set based on the instruction, a first setting method of a plurality of setting methods to be used for the setting process;
   a processor configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication;
   a changing unit configured to change the first setting method in a case that the first report is not received from the second wireless communication terminal after the instruction is received; and
   a controller configured to control the communication unit to transmit to the second wireless communication terminal, a second report indicating that the first setting method has been changed.

2. The first wireless communication terminal according to claim 1, wherein the changing unit is configured to change the first setting method in a case that the first report is not received from the second wireless communication terminal after the instruction is received, and a first request for changing the first setting method is received from the second wireless communication terminal.

3. The first wireless communication terminal according to claim 2, wherein the first request includes information that specifies a second setting method of the plurality of setting methods,
   the first request is a request for changing the first setting method to the second setting method, and
   the changing unit is configured to change the first setting method to the second setting method specified by the information.

4. The first wireless communication terminal according to claim 2, wherein the setting unit is configured to change the first setting method to a third setting method available to the first wireless communication terminal, in a case that the first request includes no information that specifies one of the plurality of setting methods.

5. The first wireless communication terminal according to claim 4, wherein the third setting method is higher in priority than the first setting method.

6. The first wireless communication terminal according to claim 2, wherein the controller is configured to control the communication unit to transmit a third report to the second wireless communication terminal after the instruction is received, the third report indicating that the first setting method is changeable, and
   the changing unit is configured to change the first setting method in a case that the first report is not received after the third report is transmitted, and the first request is received.

7. The first wireless communication terminal according to claim 2, wherein the controller is configured to control the communication unit to transmit to the second wireless communication terminal, a fourth report including information indicating the first setting method, and
   the changing unit is configured to change the first setting unit in a case that the first report is not received after the fourth report is transmitted, and the first request is received.

8. The first wireless communication terminal according to claim 7, wherein the fourth report further includes information indicating at least one of the plurality of setting methods which is available to the first wireless communication terminal.

9. The first wireless communication terminal according to claim 1, wherein the second report includes information indicating a fourth setting method of the plurality of setting methods, and
   the second report indicates that the first setting method has been changed to the fourth setting method.

10. The first wireless communication terminal according to claim 1, wherein the changing unit is configured to, in a case that the first report is not received after the instruction is received, a fifth report including information indicating at least one setting method available to the second wireless communication terminal is received, and the at least one setting method does not include the first setting method, change the first setting method to a fifth setting method included in the at least one setting method.

11. The first wireless communication terminal according to claim 1, wherein the changing unit is configured to change the first setting method in a case that a sixth report is received after the instruction is received, the sixth report including information indicating a sixth setting method to be used for the second wireless communication terminal to perform the first encrypted communication, the sixth setting method being different from the first setting method, and the sixth setting method is higher in priority than the first setting method.

12. The first wireless communication terminal according to claim 1, wherein the changing unit is configured to change the first setting method in a case that the first report is not received after the instruction is received, and a seventh report is received, the seventh report including information indicating that a seventh setting method to be used for the second wireless communication terminal to perform the first encrypted communication is unchangeable.

13. A first wireless communication terminal comprising:
a communication unit configured to wirelessly communicate with a second wireless communication terminal;
a receiving unit configured to receive an instruction to initiate a setting process of setting unique information to be used for a first encrypted communication with the second wireless communication terminal;
a setting unit configured to set based on the instruction, a first setting method of a plurality of setting methods to be used for the setting process;
a processor configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication, the processor being configured to perform the setting process using the first setting method and perform the set-up process in a case that the first report is not received from the second wireless communication terminal after the instruction is received, and a second report is received, the second report indicating that a third setting method to be used for the second wireless communication terminal to perform the first encrypted communication has been changed.

14. The first wireless communication terminal according to claim 13, further comprising:
a controller configured to control the communication unit to transmit a first request for changing the third setting method to the second wireless communication terminal, in a case that the first report is not received after the instruction is received.

15. The first wireless communication terminal according to claim 14, wherein the first request includes information that specifies a fourth setting method of the plurality of setting methods which is available to the first wireless communication terminal, and
the first request is a request for changing the third setting method to the fourth setting method specified.

16. The first wireless communication terminal according to claim 14, wherein the first request includes information that specifies the first setting method, and
the first request is a request for changing the third setting method to the first setting method specified.

17. The first wireless communication terminal according to claim 13, further comprising:
a controller configured to, in a case that the first report is not received after the instruction is received, and a third report including information indicating at least one setting method available to the second wireless communication is received, control the communication unit to transmit to the second wireless communication terminal, a second request including information that specifies one of the at least one setting method and requesting for changing the third setting method to the specified one of the at least one setting method.

18. The first wireless communication terminal according to claim 13, further comprising:
a controller configured to, in a case that the first report is not received after the instruction is received, and a fourth report indicating that the third setting method is changeable is received, control the communication unit to transmit to the second wireless communication terminal, a third request for changing the third setting method.

19. The first wireless communication terminal according to claim 13, further comprising:
a controller configured to, in a case that a fifth report is received after the instruction is received, the fifth report including information indicating a fifth setting method to be used for the second wireless communication terminal to perform the first encrypted communication, and the fifth setting method being different from the first setting method, control the communication unit to transmit to the second wireless communication terminal, a fourth request for changing the fifth setting method.

20. The first wireless communication terminal according to claim 19, wherein the controller is configured to control the communication unit to transmit the fourth request to the second wireless communication terminal, in a case that a sixth report is received after the fifth report is received, the sixth report indicating at least one setting method available to the second wireless communication terminal, and the at least one setting method includes one of the plurality of setting methods which is available to the first wireless communication terminal.

21. The first wireless communication terminal according to claim 20, wherein the controller is configured to transmit the fourth request to the second wireless communication terminal in a case that the at least one setting method includes the first setting method.

22. The first wireless communication terminal according to claim 19, wherein the controller is configured to transmit the fourth request to the second wireless communication terminal in a case that any one of the plurality of setting methods which is available to the first wireless communication terminal is higher in priority than the fifth setting method.

23. The first wireless communication terminal according to claim 19, wherein the controller is configured to transmit the fourth request to the second wireless communication terminal in a case that the first setting method is higher in priority than the fifth setting method.

24. The first wireless communication terminal according to claim 14, wherein the controller is configured to control the communication unit to transmit the first request to the second wireless communication terminal in a case that the first report is not received within a predetermined period of time after the instruction is received.

25. The first wireless communication terminal according to claim 13, wherein the controller is configured to perform the setting process using the first setting method, and perform the set-up process, in a case that a sixth report is received from the second wireless communication terminal after the instruction is received, the sixth report including information indicating a sixth setting method to be used for the second wireless communication terminal to perform the first encrypted communication, the sixth setting method being different from the first setting method, and a seventh report is received from the second wireless communication terminal after the sixth report is received, the seventh report including information that specifies a seventh setting method to be used for the second wireless communication terminal to perform the first encrypted communication, and the seventh report indicating that the sixth setting method has been changed.

26. The first wireless communication terminal according to claim 25, wherein the seventh setting method is identical to the first setting method.

27. The first wireless communication terminal according to claim 25, further comprising:
a changing unit configured to change the first setting method to the seventh setting method, in a case that the sixth report is received after the instruction is received, and the seventh report is received alter the sixth report is received,
wherein the processor is configured to, in a case that the seventh report is received, perform the setting process using the seventh setting method, and perform the set-up process.

28. A communication system comprising:
a first wireless communication terminal; and
a second wireless communication terminal,
wherein the first wireless communication terminal comprises:
a communication unit configured to wirelessly communicate with a second wireless communication terminal;
a receiving unit configured to receive an instruction to initiate a setting process of setting unique information to be used for a first encrypted communication with the second wireless communication terminal;
a setting unit configured to set based on the instruction, a first setting method of a plurality of setting methods to be used for the setting process;
a processor configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication;
a changing unit configured to change the first setting method in a case that the first report is not received from the second wireless communication terminal after the instruction is received; and
a controller configured to control the communication unit to transmit to the second wireless communication terminal, a second report indicating that the first setting method has been changed.

29. A communication system comprising:
a first wireless communication terminal; and
a second wireless communication terminal,
wherein the first wireless communication terminal comprises:
a communication unit configured to wirelessly communicate with a second wireless communication terminal;
a receiving unit configured to receive an instruction to initiate a setting process of setting unique information to be used for a first encrypted communication with the second wireless communication terminal;
a setting unit configured to set based on the instruction, a first setting method of a plurality of setting methods to be used for the setting process;
a processor configured to, in a case that a first report is received from the second wireless communication terminal after the instruction is received, the first report including information indicating a second setting method to be used for the second wireless communication terminal to perform the first encrypted communication, and the second setting method being identical to the first setting method, perform the setting process using the first setting method, and perform a set-up process of specifying an authentication method and an encryption method to be used for a second encrypted communication with the second wireless communication terminal, the second encrypted communication being performed after the first encrypted communication, the processor being configured to perform the setting process using the first setting method and perform the set-up process in a case that the first report is not received from the second wireless communication terminal after the instruction is received, and a second report is received, the second report indicating that a third setting method to be used for the second wireless communication terminal to perform the first encrypted communication has been changed.

30. A wireless communication method for a first wireless communication terminal, the communication method comprising:
receiving an instruction to initiate a setting process of setting unique information to be used for a first encrypted communication with a second wireless communication terminal;
setting based on the instruction, a first setting method of a plurality of setting methods to be used for the setting process;
in a case that a first report is received from the second wireless communication terminal after the instruction is received, the first report including information indicating a second setting method to be used for the second wireless communication terminal to perform the first encrypted communication, and the second setting method being identical to the first setting method, performing the setting process using the first setting method, and perforating a set-up process of specifying an authentication method and an encryption method to be used for a second encrypted communication with the second wireless communication terminal, the second encrypted communication being performed after the first encrypted communication; and
in a case that the first report is not received from the second wireless communication terminal after the instruction is received, changing the first setting method, and transmitting to the second wireless communication terminal, a second report indicating that the first setting method has been changed.

31. A wireless communication method for a first wireless communication terminal, the communication method comprising:
receiving an instruction to initiate a setting process of setting unique information to be used for a first encrypted communication with a second wireless communication terminal;
setting based on the instruction, a first setting method of a plurality of setting methods to be used for the setting process;
in a case that a first report is received from the second wireless communication terminal after the instruction is received, the first report including information indicating a second setting method to be used for the second wireless communication terminal to perform the first encrypted communication, and the second setting method being identical to the first setting method, performing the setting process using the first setting method, and performing a set-up process of specifying an authentication method and an encryption method to be used for a second encrypted communication with the second wireless communication terminal, the second encrypted communication being performed after the first encrypted communication; and in a case that the first report is not received from the second wireless communication terminal after the instruction is received, and a second report is received, the second report indicating that a third setting method to be used for the second wireless communication terminal to perform the first encrypted communication has been changed, performing the setting process using the first setting method and perform the set-up process.

32. A non-transitory computer program product storing a program that causes a computer of a first wireless communication terminal to execute:

receiving an instruction to initiate a setting process of setting unique information to be used for a first encrypted communication with a second wireless communication terminal;

setting based on the instruction, a first setting method of a plurality of setting methods to be used for the setting process;

in a case that a first report is received from the second wireless communication terminal after the instruction is received, the first report including information indicating a second setting method to be used for the second wireless communication terminal to perform the first encrypted communication, and the second setting method being identical to the first setting method, perforating the setting process using the first setting method, and performing a set-up process of specifying an authentication method and an encryption method to be used for a second encrypted communication with the second wireless communication terminal, the second encrypted communication being performed after the first encrypted communication; and in a case that the first report is not received from the second wireless communication terminal after the instruction is received, changing the first setting method, and transmitting to the second wireless communication terminal, a second report indicating that the first setting method has been changed.

33. A non-transitory computer program product storing a program that causes a computer of a first wireless communication terminal to execute:

receiving an instruction to initiate a setting process of setting unique information to be used for a first encrypted communication with a second wireless communication terminal;

setting based on the instruction, a first setting method of a plurality of setting methods to be used for the setting process;

in a case that a first report is received from the second wireless communication terminal after the instruction is received, the first report including information indicating a second setting method to be used for the second wireless communication terminal to perform the first encrypted communication, and the second setting method being identical to the first setting method, performing the setting process using the first setting method, and performing a set-up process of specifying an authentication method and an encryption method to be used for a second encrypted communication with the second wireless communication terminal, the second encrypted communication being performed after the first encrypted communication; and in a case that the first report is not received from the second wireless communication terminal after the instruction is received, and a second report is received, the second report indicating that a third setting method to be used for the second wireless communication terminal to perform the first encrypted communication has been changed, performing the setting process using the first setting method and perform the set-up process.

* * * * *